United States Patent
Oshikiri et al.

(10) Patent No.: US 7,664,904 B2
(45) Date of Patent: Feb. 16, 2010

(54) HIGH SPEED SERIAL SWITCH FABRIC PERFORMING MAPPING OF TRAFFIC CLASSES ONTO VIRTUAL CHANNELS

(75) Inventors: Koji Oshikiri, Miyagi (JP); Noriyuki Terao, Miyagi (JP); Junichi Ikeda, Miyagi (JP); Atsuhiro Oizumi, Miyagi (JP); Satoru Numakura, Miyagi (JP); Yutaka Maita, Miyagi (JP); Tomonori Tanaka, Kanagawa (JP); Hiroyuki Kimbara, Kanagawa (JP); Keiichi Iwasaki, Kanagawa (JP); Toshihiro Tsukagoshi, Kanagawa (JP); Iwao Hamaguchi, Kanagawa (JP); Hidetake Tanaka, Tokyo (JP); Naoki Tsumura, Kanagawa (JP); Hiroo Kitagawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 191 days.

(21) Appl. No.: 11/684,229

(22) Filed: Mar. 9, 2007

(65) Prior Publication Data

US 2007/0211746 A1 Sep. 13, 2007

(30) Foreign Application Priority Data

| Mar. 10, 2006 | (JP) | ............................. 2006-066364 |
| Mar. 16, 2006 | (JP) | ............................. 2006-073413 |
| Jan. 22, 2007 | (JP) | ............................. 2007-012023 |
| Jan. 24, 2007 | (JP) | ............................. 2007-014281 |

(51) Int. Cl.
*G06F 13/00* (2006.01)

(52) U.S. Cl. ....................... 710/316; 370/229; 370/235; 370/443; 370/444

(58) Field of Classification Search ................. 710/313, 710/316; 370/229, 230, 235, 241, 252, 431, 370/443, 444
See application file for complete search history.

(56) References Cited

U.S. PATENT DOCUMENTS 7,283,468 B1 * 10/2007 Hill et al. .................... 370/229

(Continued)

FOREIGN PATENT DOCUMENTS

JP  7-200318  8/1995

(Continued)

OTHER PUBLICATIONS

"Advanced Switching Technology Tech Brief"; ASI-SIG Advanced Switching Technology SIG; undated, accessed via internet Mar. 9, 2009.*

(Continued)

*Primary Examiner*—Glenn A Auve
(74) *Attorney, Agent, or Firm*—Oblon, Spivak, McClelland, Maier & Neustadt, L.L.P.

(57) ABSTRACT

A high-speed serial switch fabric is configured to perform a mapping of a traffic class that is capable of differentiating traffics onto a virtual channel. The high-speed serial switch fabric connects a plurality of devices. A traffic-class setting unit sets, when a conflict occurs between devices connected to the high-speed serial switch fabric, the traffic class for each of traffics in the devices having the conflict. A channel setting unit assigns each of set traffic classes to different virtual channels, and gives a priority of data communication to each of the set traffic classes.

15 Claims, 35 Drawing Sheets

U.S. PATENT DOCUMENTS

| | | | |
|---|---|---|---|
| 2004/0019714 | A1 | 1/2004 | Kelley et al. |
| 2005/0248584 | A1 | 11/2005 | Takeo et al. |
| 2005/0254085 | A1 | 11/2005 | Oshikiri et al. |
| 2006/0026327 | A1 | 2/2006 | Arndt et al. |
| 2006/0114918 | A1 | 6/2006 | Ikeda et al. |
| 2006/0140126 | A1* | 6/2006 | Zhong et al. ................ 370/241 |
| 2006/0171300 | A1 | 8/2006 | Oshikiri et al. |
| 2006/0173986 | A1 | 8/2006 | Ikeda et al. |
| 2006/0187944 | A1 | 8/2006 | Takeo et al. |
| 2006/0209722 | A1 | 9/2006 | Takeo et al. |
| 2006/0227143 | A1 | 10/2006 | Maita et al. |

FOREIGN PATENT DOCUMENTS

| | | |
|---|---|---|
| JP | 2001-16382 | 1/2001 |
| JP | 2005-354658 | 12/2005 |
| JP | 2006-92286 | 4/2006 |
| JP | 2006-99180 | 4/2006 |

OTHER PUBLICATIONS

Trefts, Chuck; "PCI Express Advanced Switching is About to Come into its Own"; RTC Magazine; Dec. 2004; accessed via <url: http://www.rtcmagazine.com/home/article.php?id=100273>, Mar. 9, 2009.*

Kendall, Chris; "The Advanced Switching Advantage"; RTC Magazine; Nov. 2005; accessed via <url: http://www.rtcmagazine.com/home/article.php?id=100448>, Mar. 9, 2009.*

Takashi Satomi, "Outline of the PCI Express Standard", Interface, Jul. 2003, pp. 80-92 (With English Translation (pp. 1- 47)).

Eugin Hyun, et al., "The Effective Buffer Architecture for Data Link Layer of PCI Express", Proceedings of the International Conference on Information Technology: Coding and Computing, XP 010697028, vol. 1, Apr. 5, 2004, pp. 809-813.

U.S. Appl. No. 11/767,207, filed Jun. 22, 2007, Oshikiri, et al.

* cited by examiner

FIG. 14

| STATE | STATUS | TIME REQUIRED FOR L0 RECOVERY |
|---|---|---|
| L0 | ACTIVE (NORMAL) | |
| L0s | LINK IS AT COMMON MODE VOLTAGE<br>CLOCK AND MAIN POWER SUPPLY ARE ON | 16 ns TO 4 $\mu$s |
| L1 | LINK IS AT COMMON MODE VOLTAGE<br>CLOCK IS OFF AND MAIN POWER SUPPLY IS ON | 1 $\mu$s TO SEVERAL 10 $\mu$s |
| L2 | CLOCK AND MAIN POWER SUPPLY ARE BOTH OFF<br>AUXILIARY POWER SUPPLY (VAUX), IF ANY, SUPPLIES POWER | SYSTEM DEPENDENT |

RECOVERY TIME FROM L2 DEPENDS ON POWER SUPPLY, PLL RISE TIME, AND OTHER FACTORS

FIG. 15

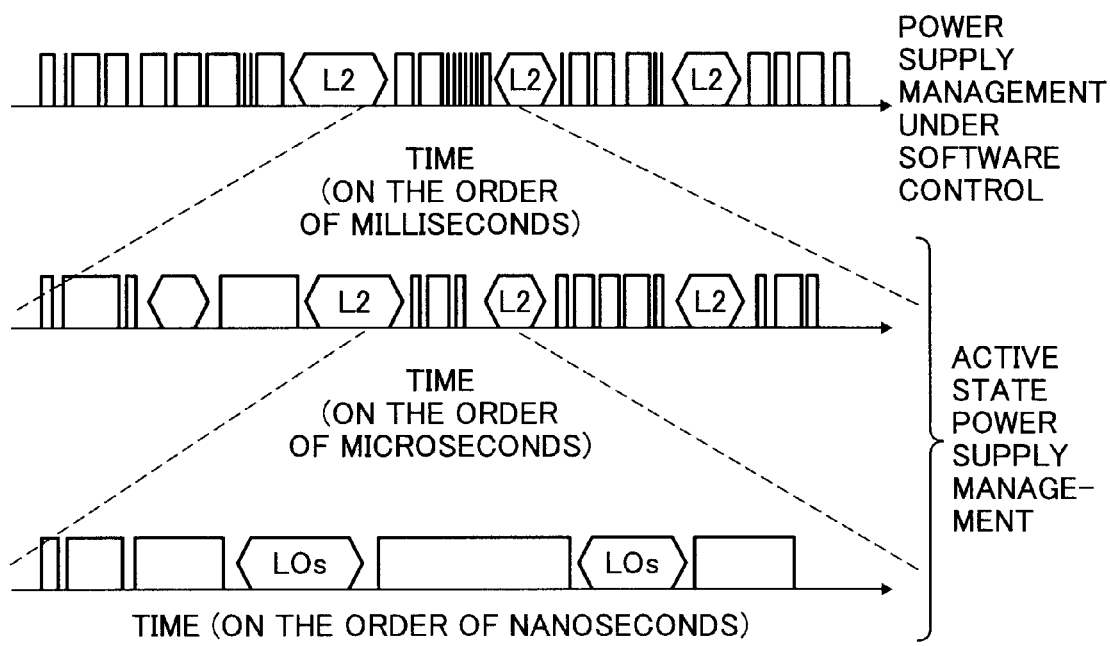

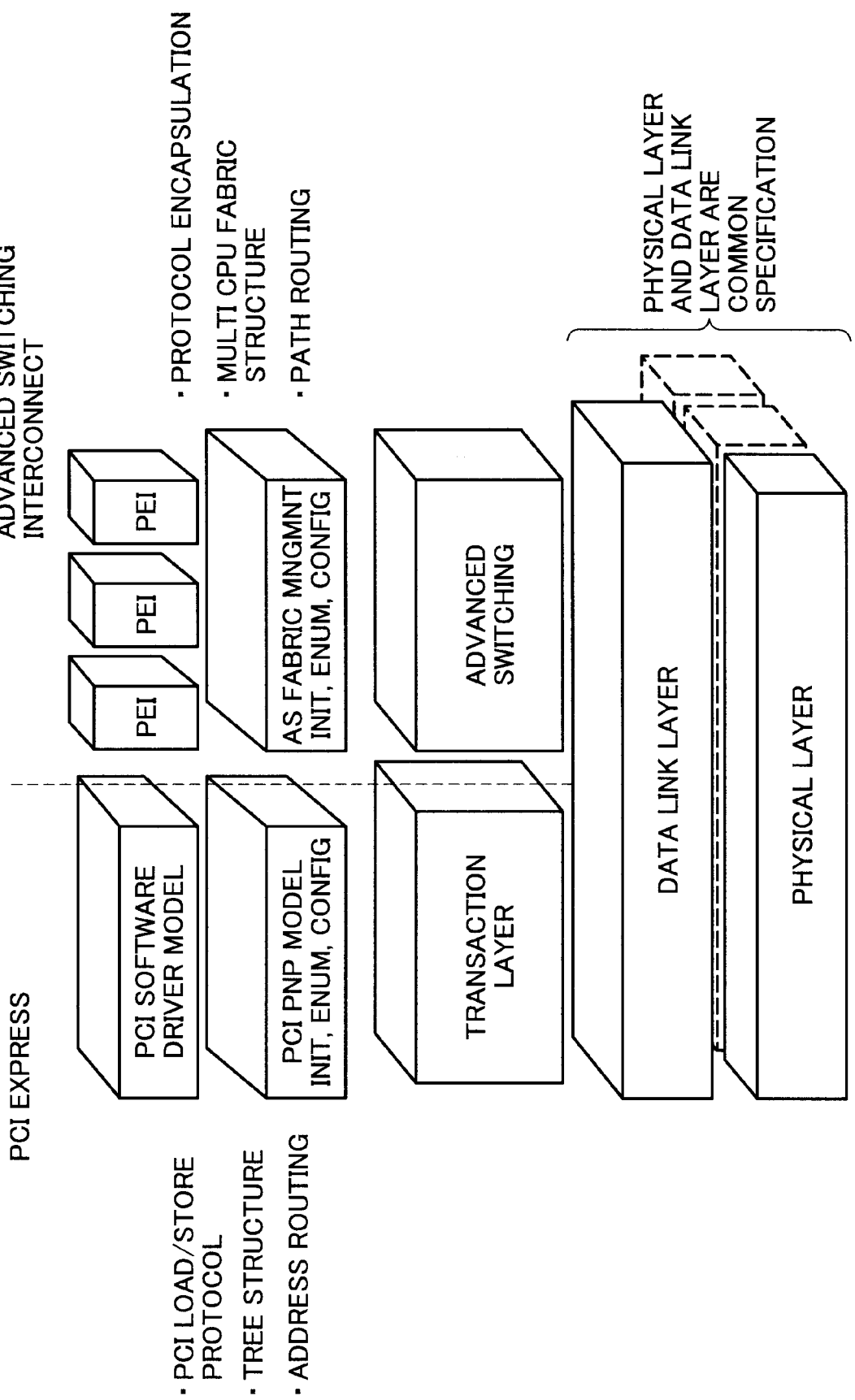

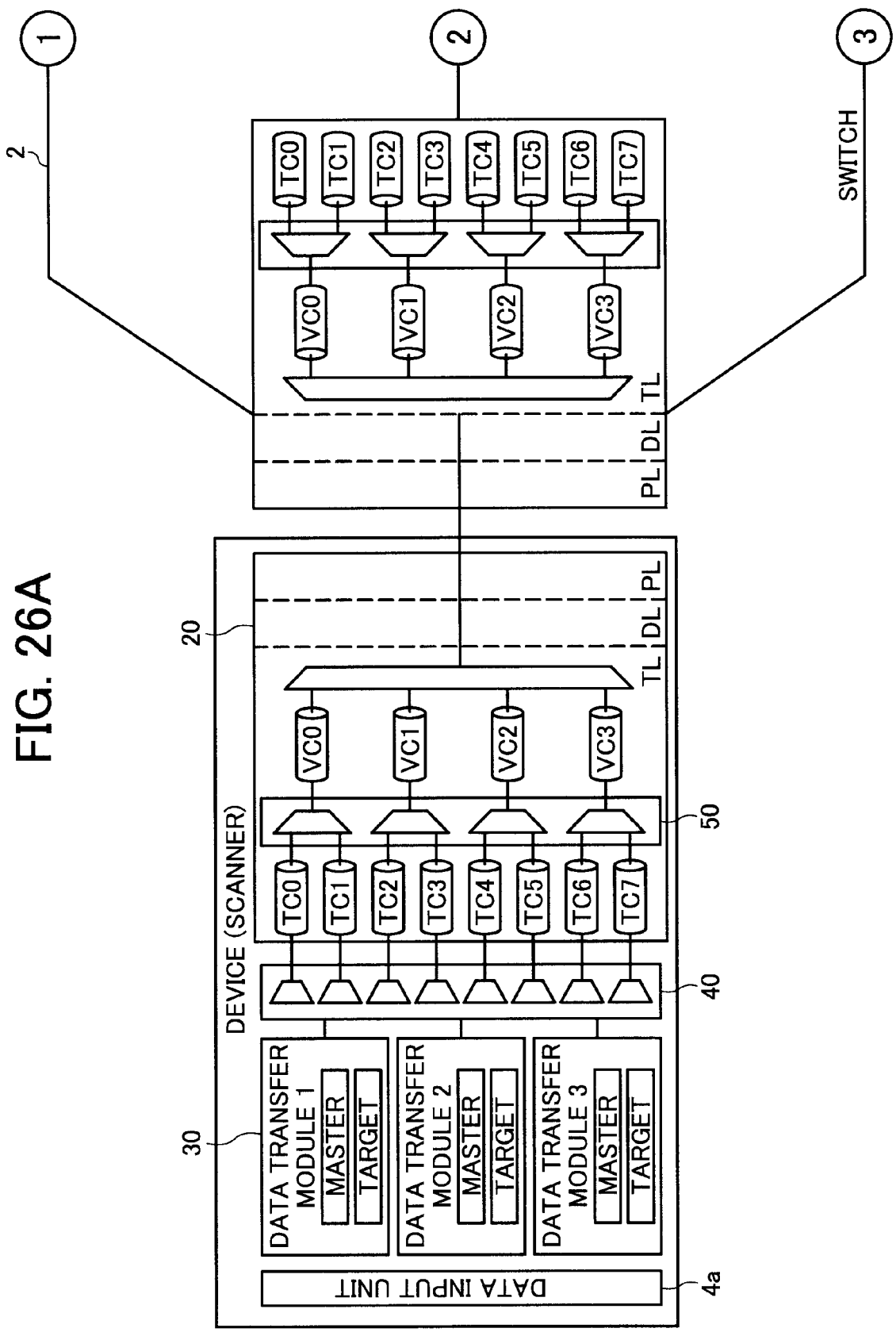

| FIG. 27A |
| FIG. 27B |

| | COMMAND TYPE | TC TO BE ASSOCIATED | CONTROL COMMAND |
|---|---|---|---|
| DATA TRANSFER MODULE 1 | MEMORY WRITE | TC0 | 0 |
| DATA TRANSFER MODULE 2 | MEMORY WRITE | TC0 | 0 |
| DATA TRANSFER MODULE 3 | MEMORY READ | TC6 | 6 |

40a

FIG. 35BB
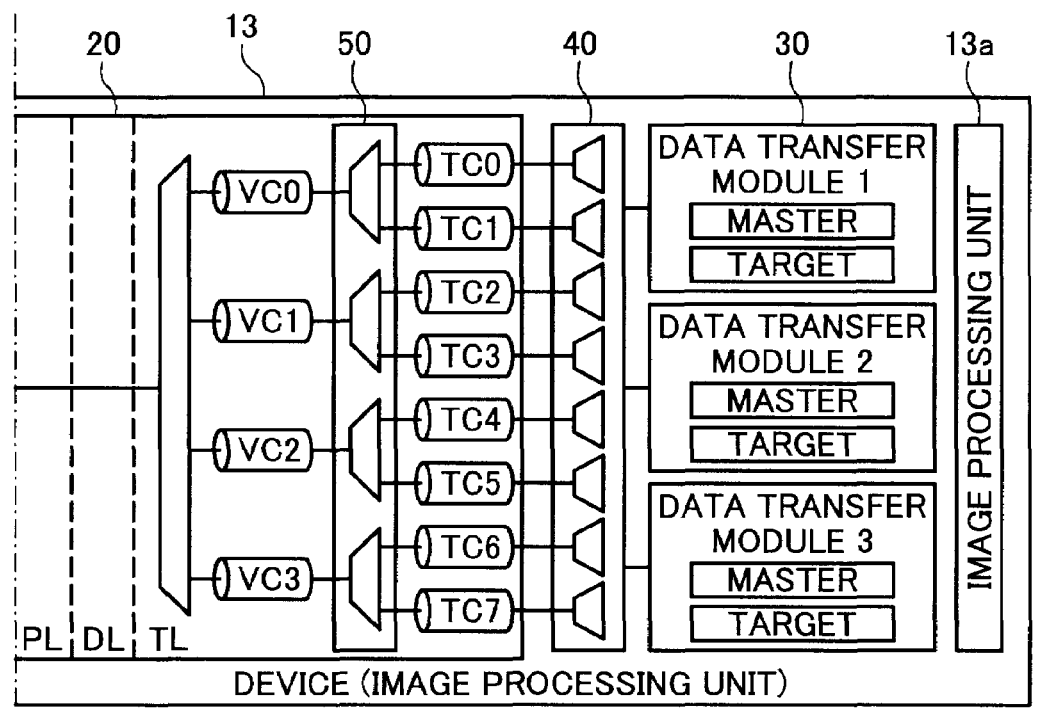
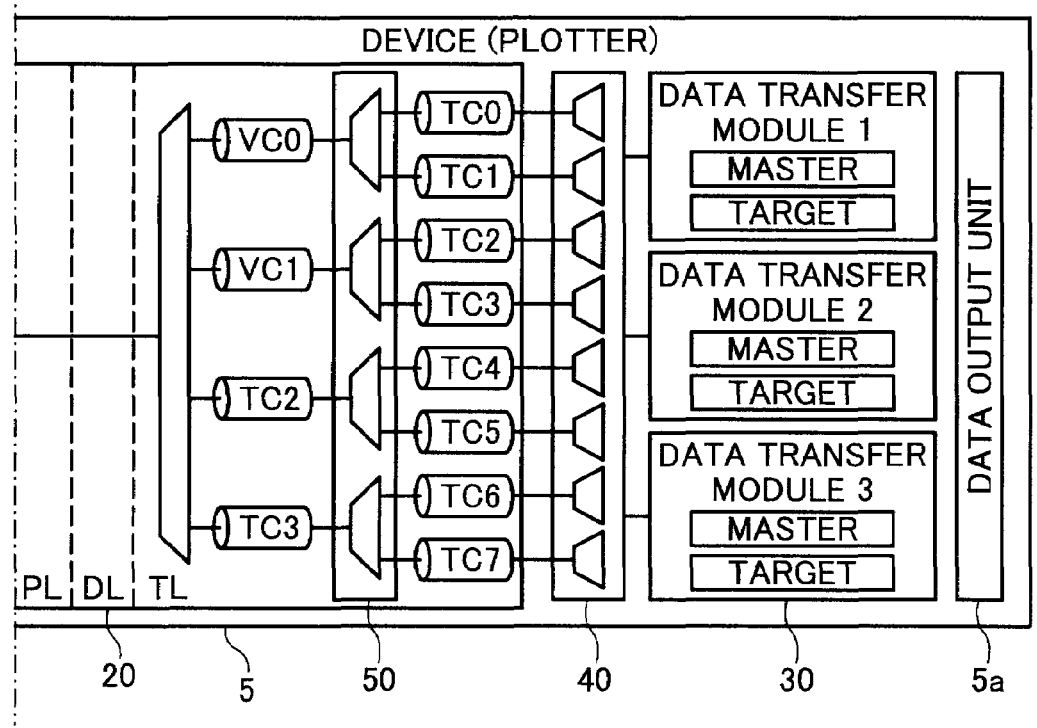

| FIG. 36A |
| FIG. 36B |

FIG. 37

| | GROUP TYPE | TC TO BE ASSOCIATED | CONTROL COMMAND |
|---|---|---|---|
| DATA TRANSFER MODULE 1 | PAGE ISOCHRONOUS RESTRICTION | TC0 | 0 |
| DATA TRANSFER MODULE 2 | PAGE ISOCHRONOUS RESTRICTION | TC0 | 0 |
| DATA TRANSFER MODULE 3 | LINE ISOCHRONOUS RESTRICTION | TC6 | 6 |

40a

HIGH SPEED SERIAL SWITCH FABRIC PERFORMING MAPPING OF TRAFFIC CLASSES ONTO VIRTUAL CHANNELS

CROSS-REFERENCE TO RELATED APPLICATIONS

The present document incorporates by reference the entire contents of Japanese priority documents, 2006-066364 filed in Japan on Mar. 10, 2006, 2006-073413 filed in Japan on Mar. 16, 2006, 2007-012023 filed in Japan on Jan. 22, 2007 and 2007-014281 filed in Japan on Jan. 24, 2007.

BACKGROUND OF THE INVENTION

1. Field of the Invention

The present invention relates to an information processing apparatus, information processing system, and data communication method, in which a plurality of devices are connected through a high-speed serial switch fabric that can perform a mapping of traffic classes capable of differentiating traffics onto virtual channels.

2. Description of the Related Art

In general, in information processing apparatuses that handle image data and other data, such as digital copiers and multifunction products (MFPs), a peripheral component interconnect (PCI) bus is used as an interface between devices.

However, in a parallel-type PCI bus, there are problems of racing and skews, for example, and its transfer rate is low at this stage for use in high-speed image forming apparatuses with high image quality. In recent years, in place of a parallel-type interface such as a PCI bus, a high-speed serial interface such as IEEE 1394 or USB has been considered for use. For example, according to Japanese Patent Application Laid-Open No. 2001-016382, the use of a high-speed serial interface such as IEEE 1394 or USB is suggested for use as an internal interface.

Another high-speed serial interface suggested is PCI Express (registered trademark), which is a succeeding version of the PCI bus standard and is now at the stage of actual use (for example, refer to "Outline of the PCI Express Standard," Takashi Satomi, Interface, July 2003). Briefly, this PCI Express system is configured as a data communication network with a tree structure, such as a root complex-switch (arbitrary layer)-device as shown in FIG. 1 in "Outline of the PCI Express Standard," Takashi Satomi, Interface, July 2003.

In recent years, the Advanced Switching Interconnect standard, which is a high-speed serial switch fabric based on the PCI Express architecture, has been laid out. This Advanced Switching Interconnect supports a wider range of applications while still adopting the technology regarding the physical layer and the link layer for PCI Express high-speed serial transmission, and its connection targets are assumed to be Chip-to-Chip and Board-to-Board. According to this Advanced Switching Interconnect, traffic classes are mapped to virtual channels, thereby making it possible to differentiate (assign priorities to) traffics.

However, even if such an interface as PCI Express is used as an interface between devices, problems to be solved still exist. Such problems are, generally, insufficient traffic control, impossible multi-host, restricted expandability, and others.

SUMMARY OF THE INVENTION

It is an object of the present invention to at least partially solve the problems in the conventional technology.

An information processing apparatus according to one aspect of the present invention includes a high-speed serial switch fabric configured to perform a mapping of a traffic class that is capable of differentiating traffics onto a virtual channel, which connects a plurality of devices; a traffic-class setting unit that sets, when a conflict occurs between devices connected to the high-speed serial switch fabric, the traffic class for each of traffics in the devices having the conflict; and a channel setting unit that assigns each of set traffic classes to different virtual channels, and gives a priority of data communication to each of the set traffic classes.

An information processing system according to another aspect of the present invention includes an information processing apparatus including an image input device that reads image data, a storage device that stores read image data, and an image output device that outputs stored image data; a high-speed serial switch fabric that connects a plurality of information processing apparatuses; a traffic-class setting unit that sets, when a conflict occurs between information processing apparatuses connected to the high-speed serial switch fabric, the traffic class for each of traffics in the information processing apparatus having the conflict; and a channel setting unit that assigns each of set traffic classes to different virtual channels, and gives a priority of data communication to each of the set traffic classes.

A data communication method according to still another aspect of the present invention includes setting, when a conflict occurs between devices connected to a high-speed serial switch fabric configured to perform a mapping of a traffic class that is capable of differentiating traffics onto a virtual channel, the traffic class for each of traffics in the devices having the conflict; and assigning each of set traffic classes to different virtual channels, and gives a priority of data communication to each of the set traffic classes.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a drawing for explaining definitions of a link state of L0/L0s/L1/L2;

FIG. 15 is a time chart of an example of control over active-state power source management;

FIG. 16 is a drawing for explaining a relation between a PCI Express Architecture and Advanced Switching Interconnect;

FIGS. 26A and 26B are block diagrams that partially depict the configuration of the information processing apparatus of FIG. 25 in detail;

FIG. 37 is a schematic drawing of one example of a setting table; and

DETAILED DESCRIPTION OF THE PREFERRED EMBODIMENTS

Exemplary embodiments of the present invention are explained in detail below with reference to the accompanying drawings.

The embodiments use PCI Express (registered trademark), which is one type of high-speed serial bus. As a premise of the embodiments, the outlines of the PCI Express standard are explained by partially extracting from "Outline of the PCI Express Standard," Takashi Satomi, Interface, July 2003. The high-speed serial bus means an interface allowing data to be exchanged at high speed (equal to or higher than approximately 100 megabits per second) through serial transmission by using one transmission line.

A PCI Express bus is a standard expansion bus for use in computers in general as a succeeding version of PCI. The PCI Express bus has features, such as low-voltage differential signal transmission, a point-to-point communication channel with independent transmission and reception, packetized split transaction, and high scalability for different link configuration.

Figure 1:
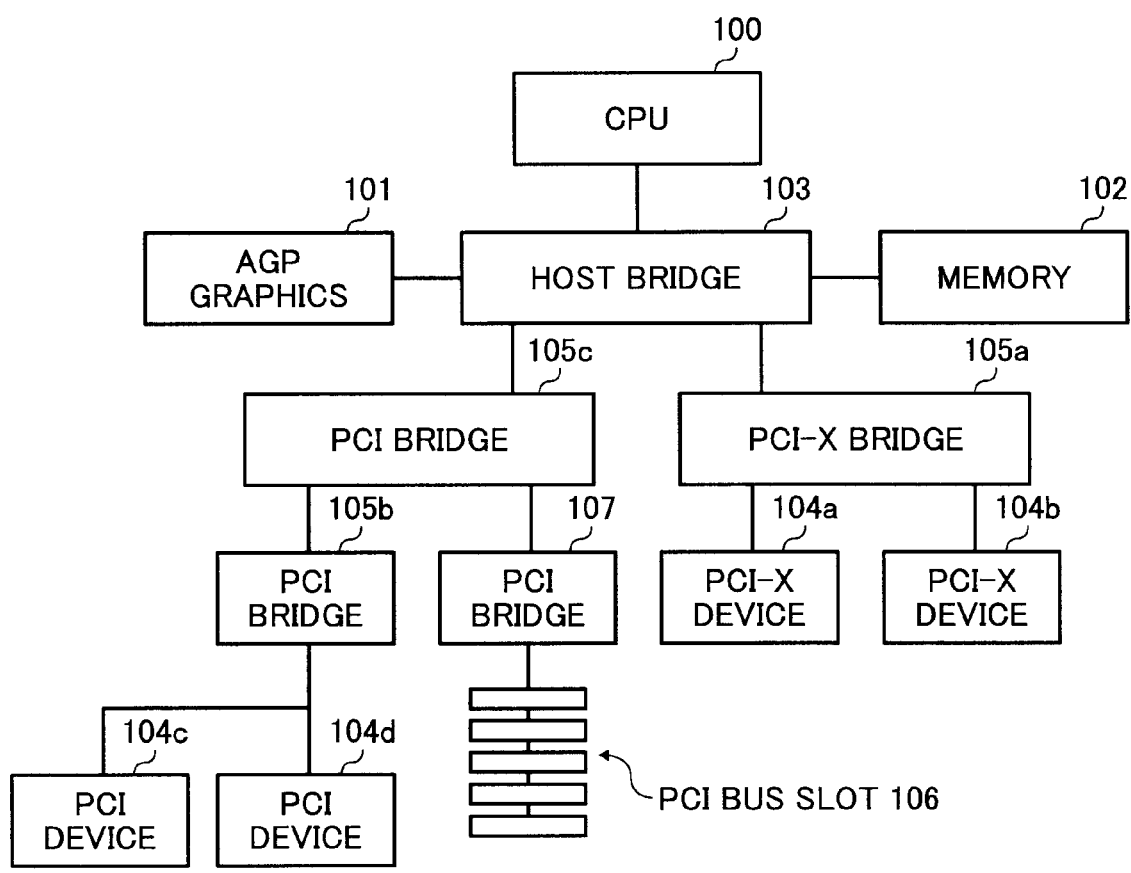
FIG. 1 is a block diagram of a configuration example of an existing PCI system.
Figure 2:
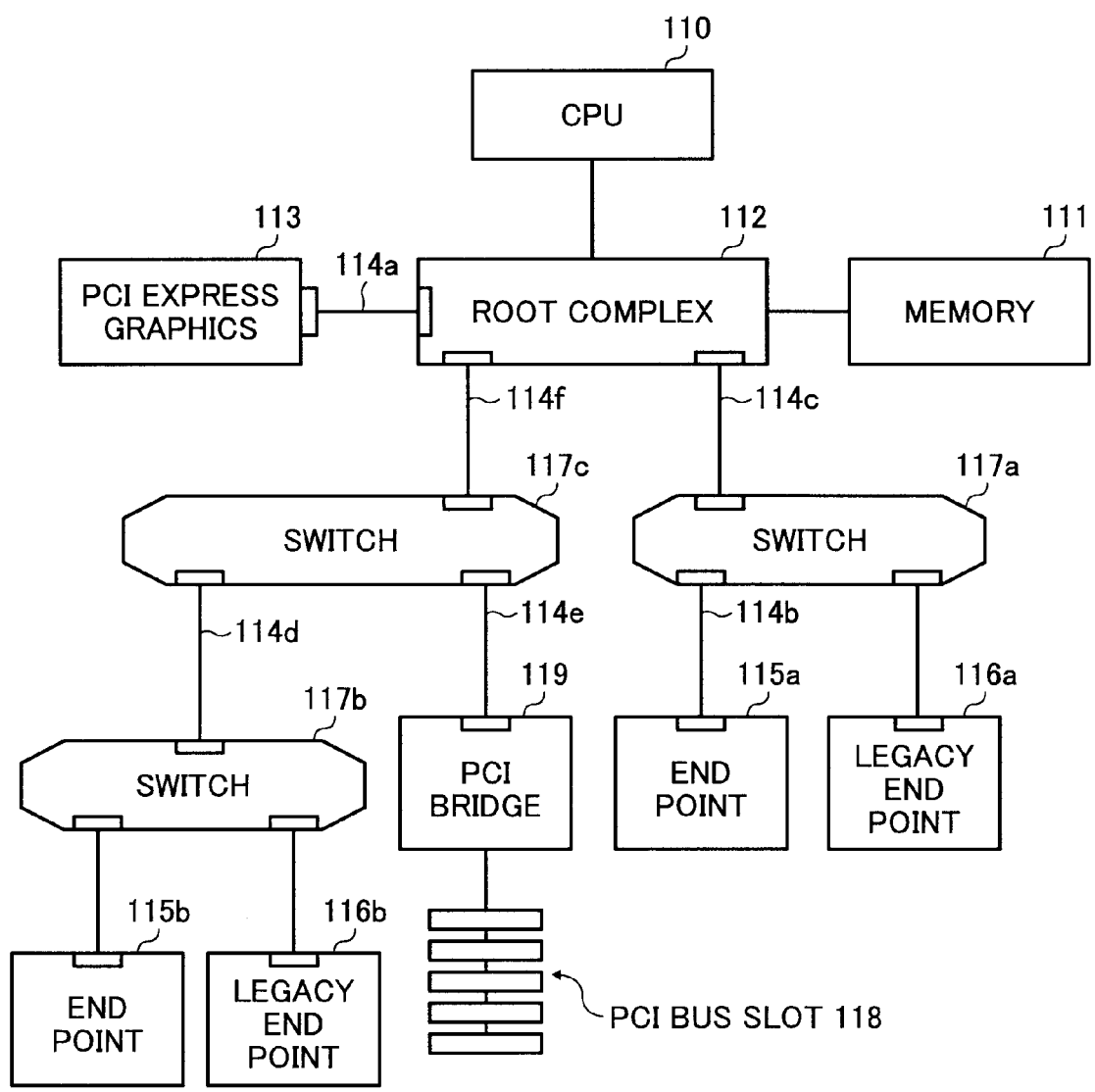
FIG. 2 is a block diagram of a configuration example of a PCI Express system.

A configuration example of an existing PCI system is shown in FIG. 1, whilst a configuration example of a PCI Express system is shown in FIG. 2. In the existing PCI system, a Central Processing Unit 100, an Accelerated Graphics Port (AGP) graphics 101, and a memory 102 are connected to a host bridge 103, to which PCI-X (a standard to which PCI is upwardly-compatible) devices 104a and 104b are connected through a PCI-X bridge 105a and to which a PCI bridge 105b having connected thereto PCI devices 104c and 104d and a PCI bridge 107 having connected thereto a PCI bus slot 106 are connected through a PCI bridge 105c, thereby forming a tree structure.

On the other hand, in the PCI Express system, a CPU 110 and a memory 111 are connected to a root complex 112, to which a PCI Express graphics 113 is connected through PCI Express 114a and to which a switch 117a having connected thereto an end point 115a and a legacy end point 116a through PCI Express 114b is connected through PCI Express 114c. Also, a switch 117c is connected to the root complex 112 through PCI Express 114f. The switch 117c has connected thereto a switch 117b through PCI Express 114d and a PCI bridge 119 through PCI Express 114e. The switch 117b has connected thereto an end point 115b and a legacy end point 116b, and the PCI bridge 119 has connected thereto a PCI bus slot 118. With this, a tree structure is formed.

Figure 3:
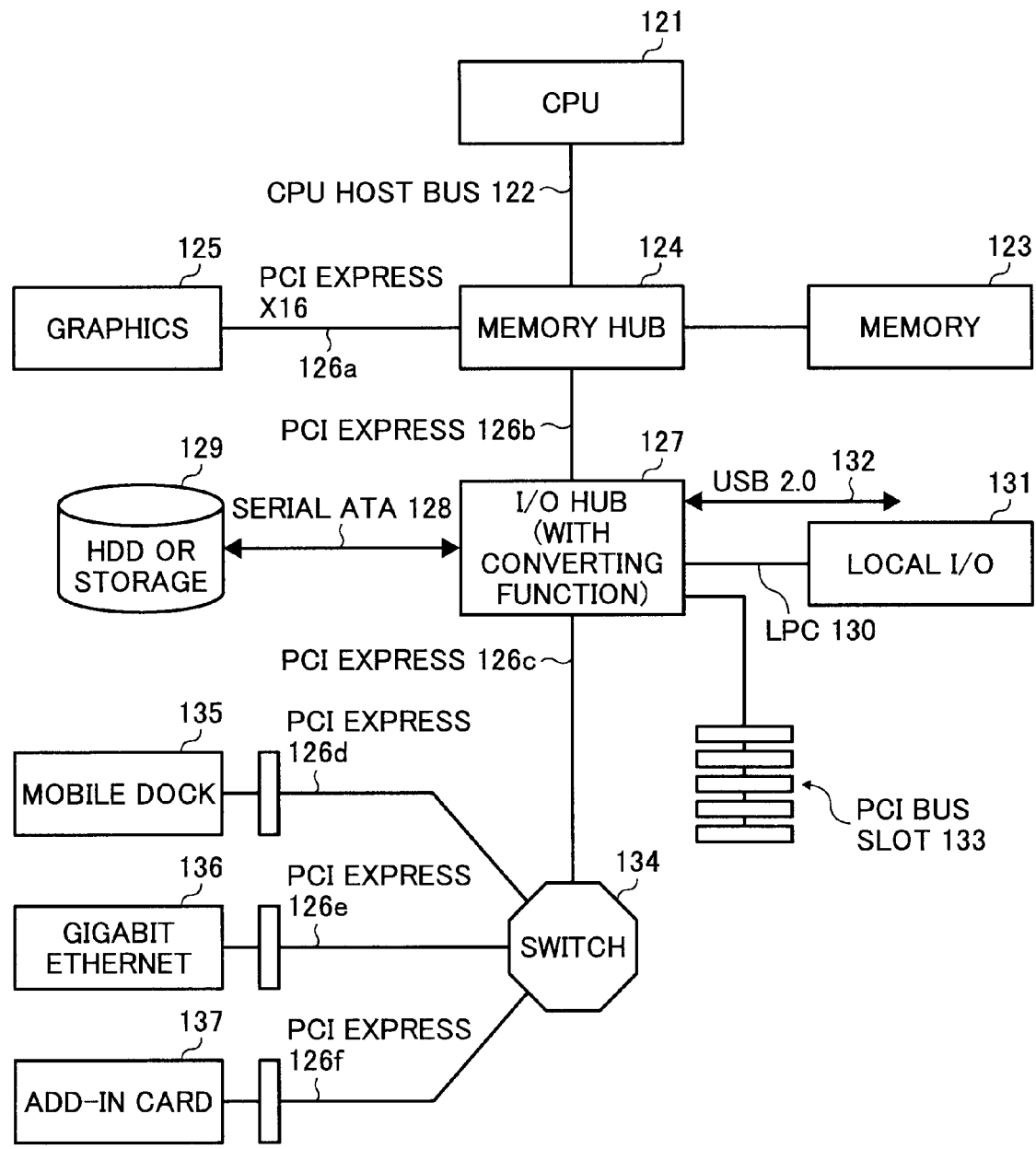
FIG. 3 is a block diagram of a configuration example of a PCI Express platform at a desktop/mobile computer.

An example of a PCI Express platform that can be practically assumed is shown in FIG. 3, which is an example of application to a desktop/mobile computer. A CPU 121 is connected through a CPU host bus 122. A memory 123 is connected to a memory hub 124 (is equivalent to a root complex), to which a graphics 125 is connected through PCI Express x16 126a and an Input/Output (I/O) hub 127 with a converting function is connected through PCI Express 126b. To this I/O hub 127, for example, a storage 129 is connected through a Serial ATA 128, a local I/O 131 is connected through a Low Pin Count (LPC) 130, and also USB 2.0 132 and a PCI bus slot 133 are connected. Furthermore, the I/O hub 127 has connected thereto a switch 134 through PCI Express 126c. The switch 134 has connected thereto a mobile dock 135 through PCI Express 126d, a gigabit Ethernet 136 (Ethernet is a registered trademark) through PCI Express 126e, and an add-in card 137 through PCI Express 126f.

That is, in the PCI Express system, conventional PCI, PCI-X, and AGP are replaced by PCI Express, and a bridge is used for connecting the existing PCI/PCI-X devices. A connection between chip sets is also replaced by a PCI Express connection, and the existing buses of IEEE 1394, Serial ATA, USB 2.0 and others are connected to PCI Express through an I/O hub.

Figure 4:
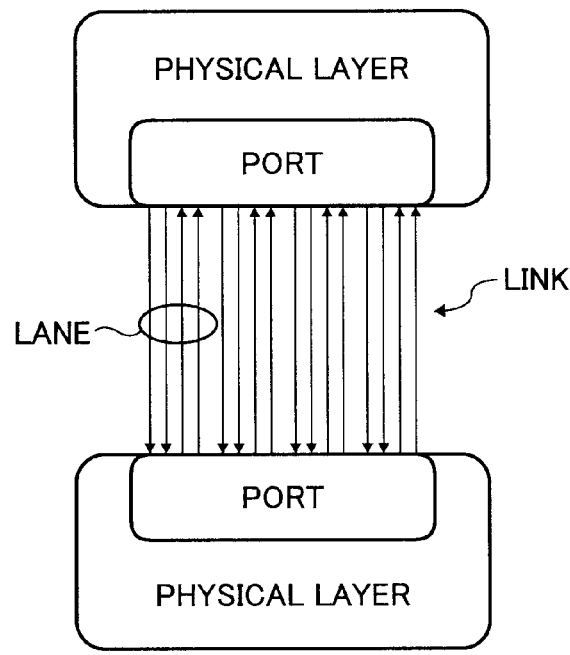
FIG. 4 is a schematic drawing of a configuration example of a physical layer in the case of x4.
Figure 5:
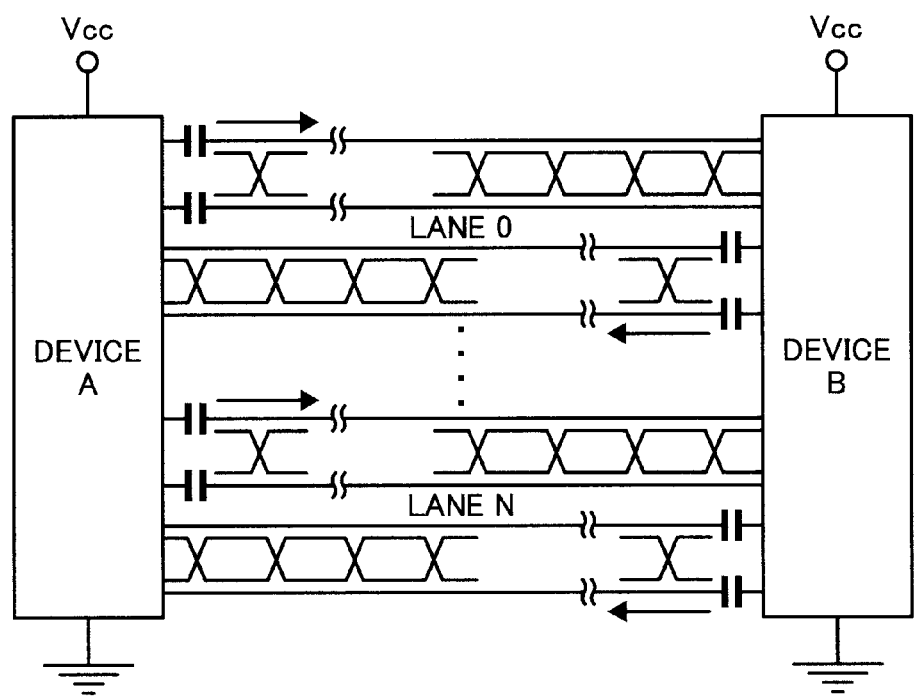
FIG. 5 is a schematic drawing of an example of a lane connection between devices.

A configuration of a physical layer is shown in FIG. 4. A port is physically in the same semiconductor and is a collection of transmitters/receivers forming a link. Logically, the port means an interface for point-to-point connection between components and the link. The transfer rate is set as, for example, 2.5 gigabits per second in one direction. A lane is a set of pairs of differential signals with 0.8 volts, and is formed of a signal pair (two signals) on a transmission side and a signal pair (two signals) on a reception side. The link is a collection of lanes connecting between two ports and is a dual simplex communication bus between components. An "xN link" is configured of N lanes and, is defined as N=1, 2, 4, 8, 16, 32 in the current standard. The example is a case of x4 link. For example, as shown in FIG. 5, by varying a lane width N connecting devices A and B, it is possible to configure a scalable bandwidth.

The root complex 112 is positioned at the top of the I/O configuration, and connects the CPU and a memory subsystem to the I/O. In a block diagram, for example, as shown in FIG. 3, the root complex is often represented as a "memory hub". The root complex 112 (or 124) has one or more PCI Express ports (root ports) (in FIG. 2, represented as rectangles in the root complex 112), each port forming an independent I/O layer domain. The I/O layer domain may be a simple end point (for example, the one on the end point 115*a* side in FIG. 2), or may be formed of many switches and end points (for example, the one on the side of the end point 115*b* and the switches 117*b* and 117*c* in FIG. 2).

The end points 115 are devices having a configuration space header of type 00h (specifically, a device other than a bridge), and are divided into a legacy end point and a PCI Express end point. A significant difference between them is that the PCI Express end point is a Base Address Register (BAR) and does not require an I/O resource, and therefore does not make an I/O request. Neither does the PCI Express end point support a lock request.

Figure 6:
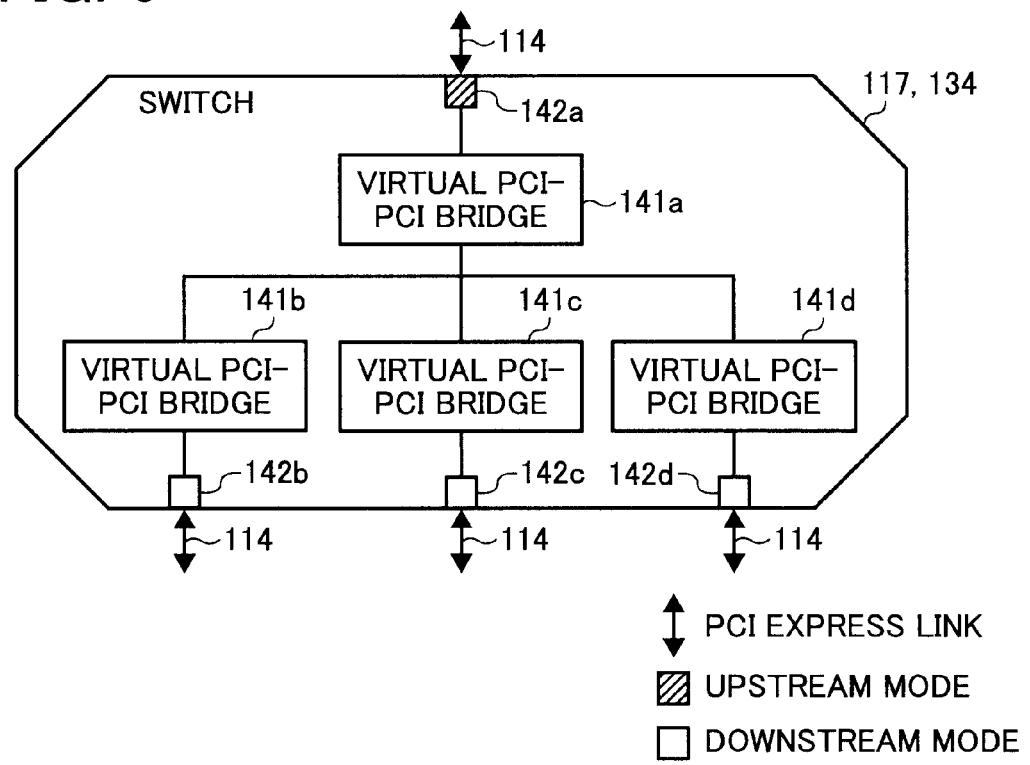
FIG. 6 is a block diagram of a logical configuration example of a switch.

The switches 117 (or 134) connect two or more ports for packet routing among ports. From configuration software, as shown in FIG. 6, each switch is recognized as a collection of virtual PCI-PCI bridges 141. In the drawing, double-headed arrows represent PCI Express links 114 (or 126), and 142*a* to 142*d* represent ports. Of these, the port 142*a* is an upstream port near the root complex, whilst the ports 142*b* to 142*d* are downstream ports away from the root complex.

A connection from PCI Express to PCI/PCI-X is provided. With this, the existing PCI/PCI-X devices can be used on the PCI Express system.

Figure 7A:
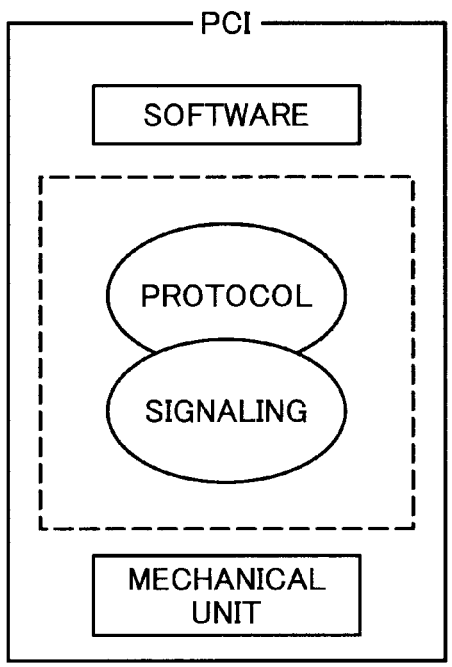
FIG. 7A is a block diagram of an architecture of an existing PCI.
Figure 7B:
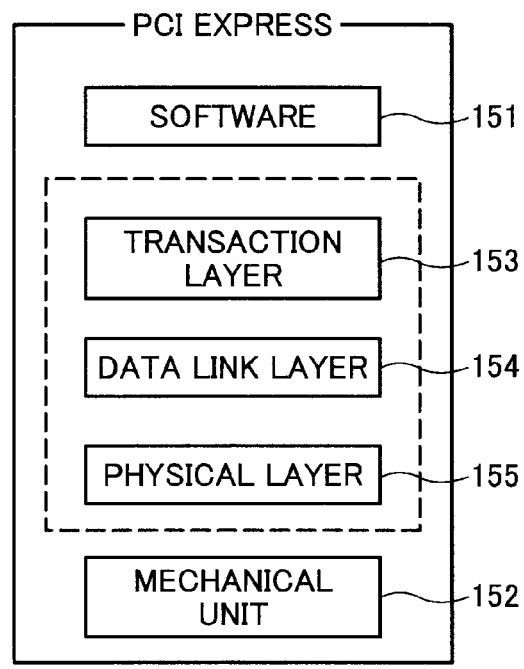
FIG. 7B is a block diagram of an architecture of a PCI Express.

The conventional PCI architecture has a structure in which a protocol and signaling are closely related to each other as shown in FIG. 7A, and the concept of hierarchy is not there. On the other hand, as with general communication protocols or InfiniBand, PCI Express has an independent hierarchal structure as shown in FIG. 7B, and specifications are defined for each layer. That is, the structure is such that, between software 151 at the top layer and a mechanical unit 152 at the bottom layer, there are a transaction layer 153, a data link layer 154, and a physical layer 155. With such a structure, modulability of each layer is ensured, thereby allowing scalability and reuse of modules. For example, when a new signal coding scheme or transmission medium is adopted, in order to support this, all what is required is to change the physical layer, and neither the data link layer nor the transaction layer has to be changed.

In the PCI Express architecture, the main components are the transaction layer 153, the data link layer 154, and the physical layer 155. Each of these layers functions as explained below with reference to FIG. 8.

Figure 9:
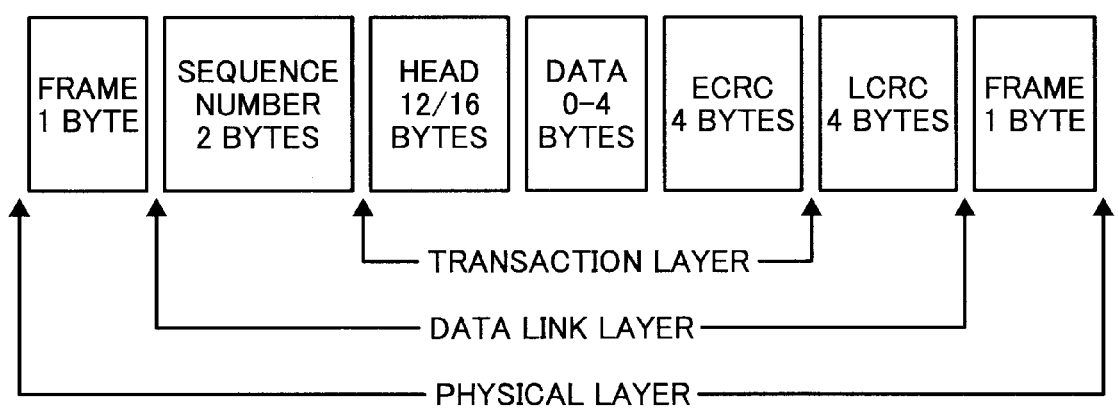
FIG. 9 is a drawing for explaining a format example of a transaction layer packet.

The transaction layer 153 is positioned at the top, and has a function of assembling and disassembling a transaction layer packet (TLP). The transaction layer packet (TLP) is used for transmission of transactions, such as read/write and various events. Also, the transaction layer 153 performs flow control using a credit for the transaction layer packet (TLP). The outlines of the transaction layer packet (TLP) in each of the layers 153 to 155 are shown in FIG. 9 (details will be explained further below).

The main function of the data link layer 154 is to ensure data integrity of the transaction layer packet (TLP) through error detection/correction (retransmission) and perform link management. Between data link layers 154, a packet for link management and flow control is exchanged. Such a packet is called a data link layer packet so as to be differentiated from the transaction layer packet (TLP).

The physical layer 155 includes necessary circuits for interface operation, such as a driver, input buffer, parallel-serial/serial-parallel converter, Phase-Locked Loop (PLL), and impedance matching circuit. Also, as a logical function, the physical layer 155 has a function of initializing and maintaining the interface. Furthermore, the physical layer 155 has a function of making the data link layer 154/transaction layer 153 independent from signal technologies used in an actual link.

In the PCI Express hardware configuration, a technology called embedded clock is adopted. In this technology, no clock signal is present and clock timing is embedded in a data signal. Based on a cross point of the data signal on the reception side, a clock is extracted.

Figure 10:
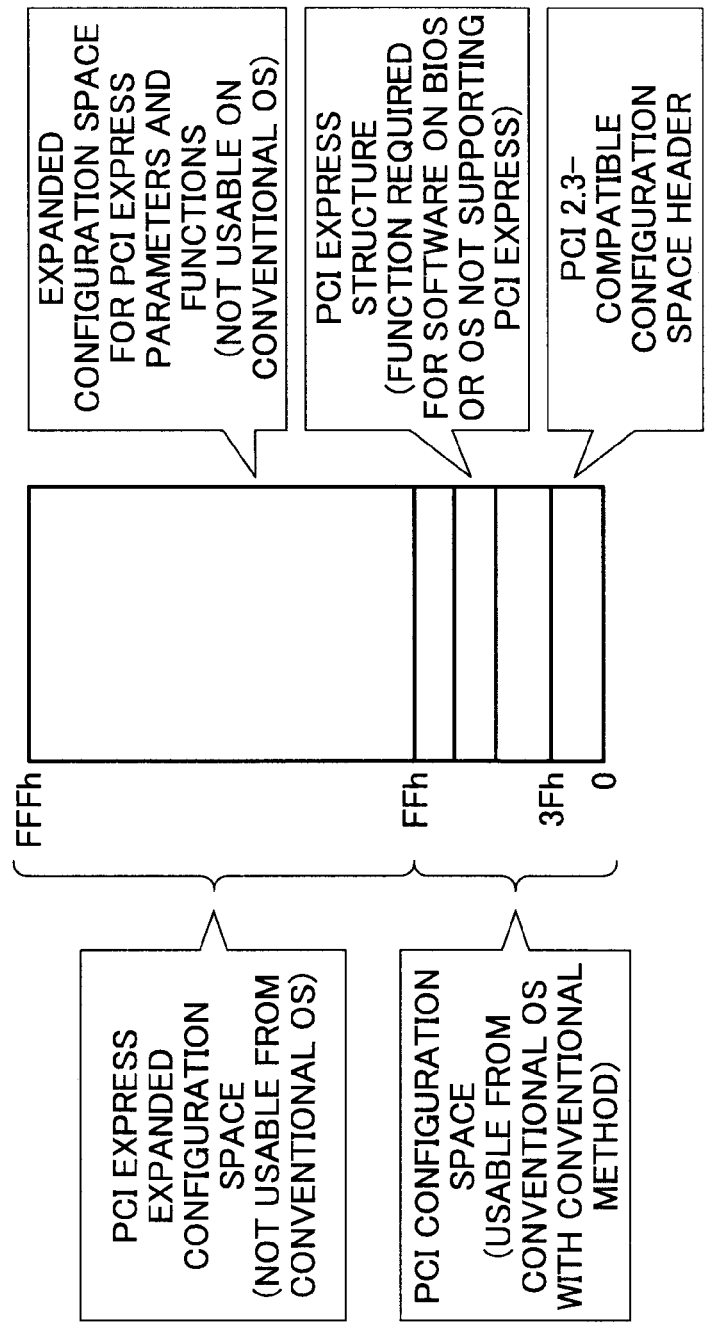
FIG. 10 is a drawing for explaining a configuration space of PCI Express.

As with the conventional PCI, PCI Express has a configuration space. However, in contrast to the size of the configuration space in the convention PCI being 256 bytes, the size is expanded to 4096 bytes as shown in FIG. 10. With this, a sufficient space that may be required in future is ensured even for a device (such as a host bridge) requiring many device-specific register sets. In PCI Express, access to the configuration space is performed through access to a flat memory space (configuration read/write), and the bus/device/function/register number are mapped to memory addresses.

This space has 256 bytes at the head, which can be accessed as a PCI configuration space even from a Basic Input Output System (BIOS) or the conventional Operating System (OS) through a scheme of using an I/O port. A function of converting the conventional access to PCI Express access is implemented on the host bridge. A PCI 2.3-compatible configuration header is formed by 00h to 3Fh. With this, the conventional OS and software can be used except for functions obtained through expansion in PCI Express. That is, the software layer in PCI Express has inherited a load store architecture compatible with the existing PCI (a scheme in which a processor directly accesses an I/O register). However, for using functions obtained through expansion in PCI Express (for example, functions of synchronous transfer and Reliability, Availability and Serviceability (RAS)), it is required to access a PCI Express Expanded space of 4 kilobytes.

The PCI Express can take various form factors (shapes). Specific examples are an add-in card, a plug-in card (Express Card), and Mini PCI Express.

The transaction layer 153, the data link layer 154, and the physical layer 155, which are main portions of the PCI Express architecture, are respectively explained.

The main function of the transaction layer 153 is, as explained above, to assemble and disassemble a transaction layer packet (TLP) between the upper software layer 151 and the lower data link layer 154.

In PCI Express, in addition to a memory space (for data transfer with the memory space), a I/O space (for data transfer with the I/O space), and a configuration space (for device configuration and setup), a message space is added (for in-band event notification and general message transmission (exchange) between PCI Express devices, and an interrupt request or confirmation is transmitted by using a message as a "virtual wire"). Therefore, four address spaces are defined. For each space, a transaction type is defined (the memory space, the I/O space, and the configuration space is defined as read/write, whilst the message space is defined as basic (including vendor definition)).

In PCI Express, communication is performed in a packet unit. In the format of the Transaction Layer Packet (TLP) shown in FIG. 9, the header length of the header is 3 DW (DW is an abbreviation of double words and 3 DW is 12 bytes) or 4 DW (16 bytes). The header contains information, such as the format of the Transaction Layer Packet (TLP) (the header length and the presence or absence of a payload), the transaction type, a Traffic Class (TC), an attribute, and a payload length. The maximum payload length in a packet is 1024 DW (4096 bytes).

End-to-end Cyclic Redundancy Check (ECRC) is to ensure end-to-end data integrity, and is 32 bits CRC in a part of the Transaction Layer Packet (TLP). ECRC is used because if an error occurs to the Transaction Layer Packet (TLP) inside the switch, the error cannot be detected through link CRC (LCRC) (because the LCRC is recalculated in the TLP where the error occurs).

Requests include a request that requires a complete packet and a request that does not require the complete packet.

Upper software can differentiate traffics by using traffic classes (TCs). For example, video data can be transferred with priority over network data. The traffic classes (TC) are classified into eight classes TC0 to TC7.

Figure 11:
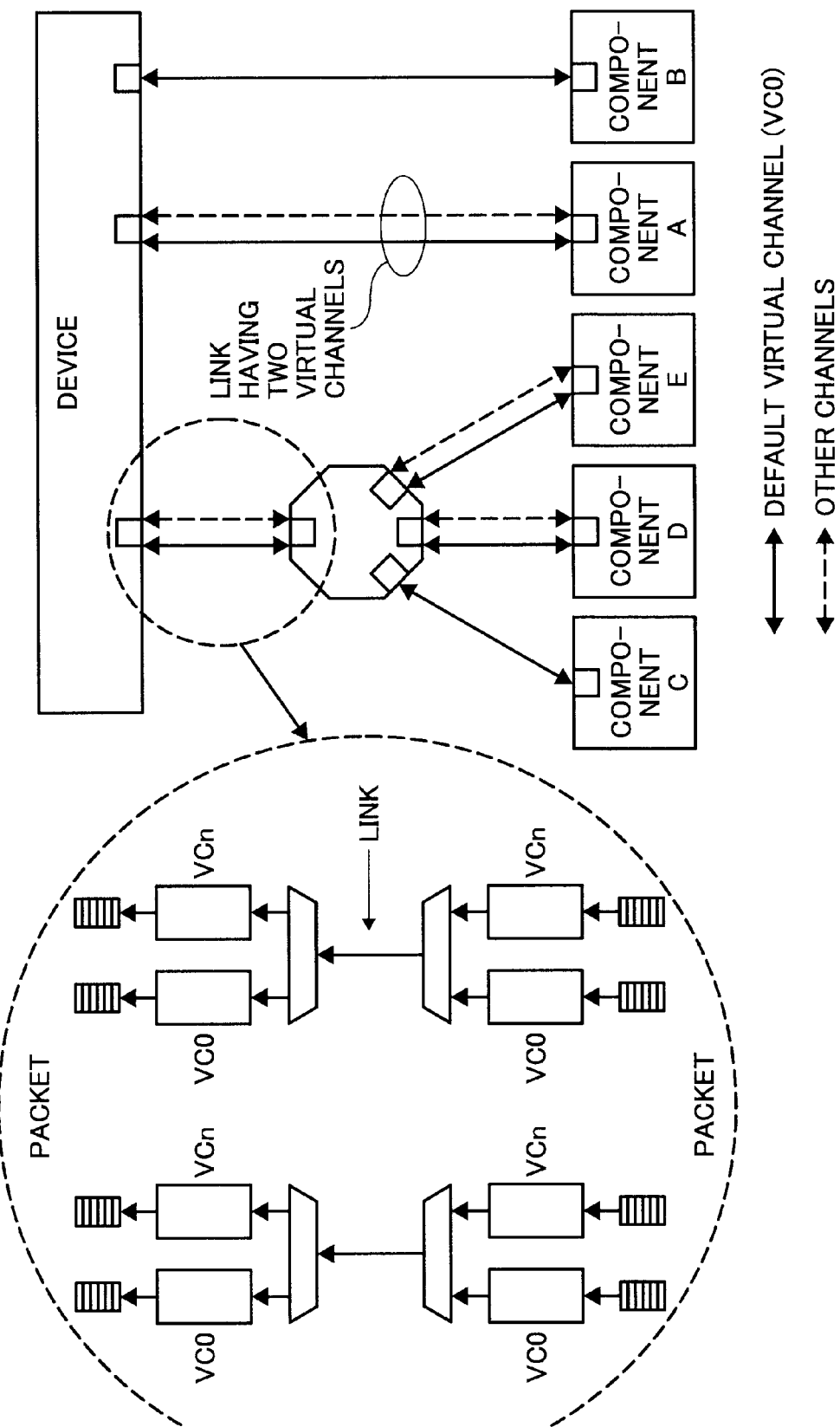
FIG. 11 is a schematic drawing for explaining a concept of a virtual channel.

Virtual Channels (VCs) are virtual communication buses independent from one another (with a mechanism in which a plurality of independent data flow buffers sharing the same link are used) and each have a resource (a buffer and a queue). As shown in FIG. 11, the virtual channels each perform independent flow control. With this, even if a buffer of one virtual channel is full, a transfer with another virtual channel can be performed. That is, the physically single link can be effectively used by being divided into a plurality of virtual channels. For example, as shown in FIG. 11, when a root link is divided into links to a plurality of devices through a switch, priorities of traffics to the respective devices can be controlled. VC0 is indispensable, and other virtual channels (VC1 to VC7) are implemented according to a tradeoff between cost and performance. In FIG. 11, solid arrow lines represent default virtual channel (VC0) and broken arrow lines represent other virtual channels (VC1 to VC7).

In the transaction layer, the Traffic Classes (TCs) are mapped to the Virtual Channels (VCs). To one Virtual Channel (VC), one or plurality of Traffic Classes (TCs) can be mapped (when the number of Virtual Channels (VCs) is small). For example, in a simple case, a Traffic Class (TC) can be mapped to each Virtual Channel (VC) in a one-to-one relationship, and all Traffic Classes (TCs) can be mapped to the virtual channel VC0. TC0-VC0 mapping is indispensable/fixed, and other mapping is controlled by the upper software. By using the Traffic Classes (TCs), the software can control the priorities of transactions.

To avoid an overflow in a reception buffer and establish a transfer order, Flow Control (FC) is performed. The flow control is performed in a point-to-point manner between links, not end-to-end. Consequently, the flow control does not allow acknowledgement of a packet reaching a final destination (completer).

The flow control in PCI Express is performed on a credit base (using a mechanism in which the empty state of a reception side buffer is confirmed before starting data transmission to avoid overflow and underflow). That is, the reception side notifies a transmission side of a buffer capacity (a credit value) at the time of initializing the link, and the transmission side then compares the credit value with the length of the packet to be transmitted and transmits the packet only when there is a certain remaining capacity. There are six types of credits.

Information exchange in flow control is performed by using a Data Link Layer Packet (DLLP) of the data link layer. The flow control is applied only to the Transaction Layer Packet (TLP) and is not applied to the Data Link Layer Packet (DLLP) (DLLP can always be transmitted and received).

The main function of the data link layer 154 is to provide a function of highly reliable Transaction Layer packet (TLP) exchange between two or more components on the link.

A Transaction Layer Packet (TLP) received from the transaction layer 153 is provided with a sequence number of 2 bytes at its head and an LCRC (link CRC) of 4 bytes at its tail, and is then passed to the physical layer 155 (refer to FIG. 9). The Transaction Layer Packet (TLP) is stored in a retry buffer and retransmitted to a destination until an acknowledgment (ACK) is received from the destination. When Transaction Layer Packets (TLPs) fail to be transmitted continuously, it is determined that the link is abnormal and the physical layer 155 is requested to perform retraining of the link. When training of the link fails, the state of the data link layer 154 is shifted to be inactive.

The sequence number and the Link CRC (LCRC) of the Transaction Layer Packet (TLP) received from the physical layer 155 are examined, and if they are normal, the TLP is sent to the transaction layer 153. If there is an error, retransmission is requested.

Figure 12:
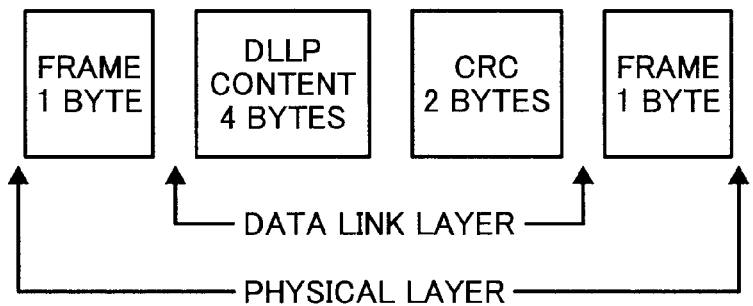
FIG. 12 is a drawing for explaining a format example of a data link layer packet.

When transmitted from the physical layer, the Transaction Layer Packet (TLP) is automatically divided into Data Link Layer Packets (DLLPS) as shown in FIG. 12 for transmission to each lane. A packet generated by the data link layer 154 is called a Data Link Layer Packet (DLLP), and is exchanged between the data link layers 154. The Data Link Layer Packet (DLLP) has the following types.

Ack/Nak: reception confirmation and retry (retransmission) of TLP;

InitFC1/InitFC2/UpdateFC: initialization and update of flow control; and

DLLP for Power source management.

As shown in FIG. 12, the length of the Data Link Layer Packet (DLLP) is 6 bytes, and is composed of a DLLP type (1 byte) for indicating a type, information specific to the type of the DLLP (3 bytes), and CRC (2 bytes).

Figure 8:
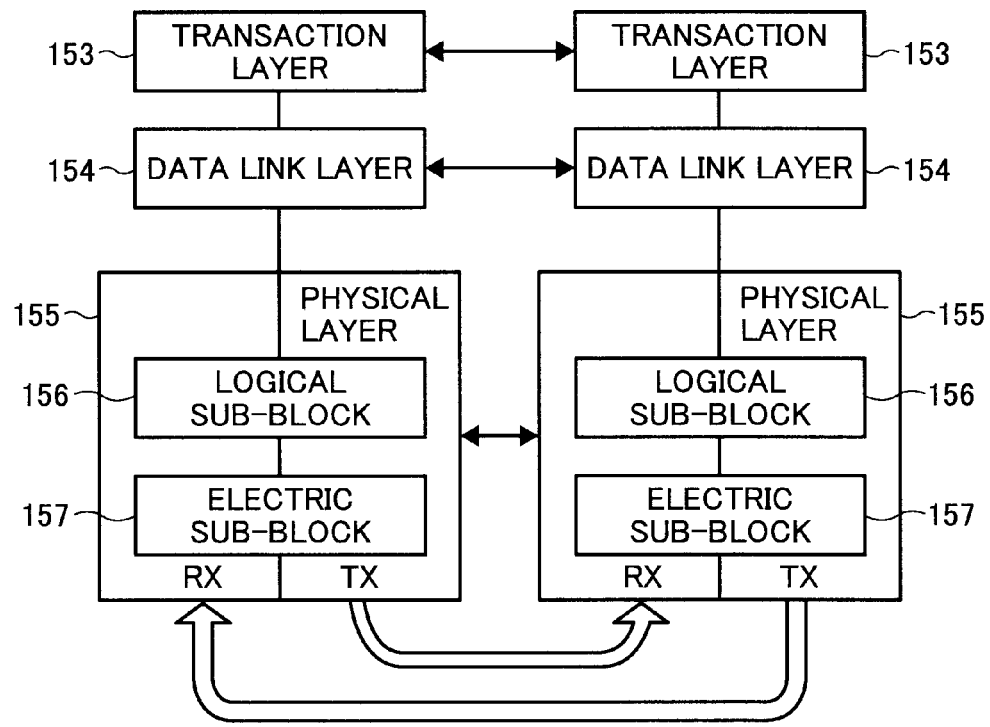
FIG. 8 is a block diagram of a hierarchical configuration of PCI Express.

The main function of a logical sub-block 156 in the physical layer 155 shown in FIG. 8 is to convert a packet received from the data link layer 154 to a format that can be transmitted at an electrical sub-block 157. Also, the logical sub-block 156 has a function of controlling and managing the physical layer 155.

Figure 13:
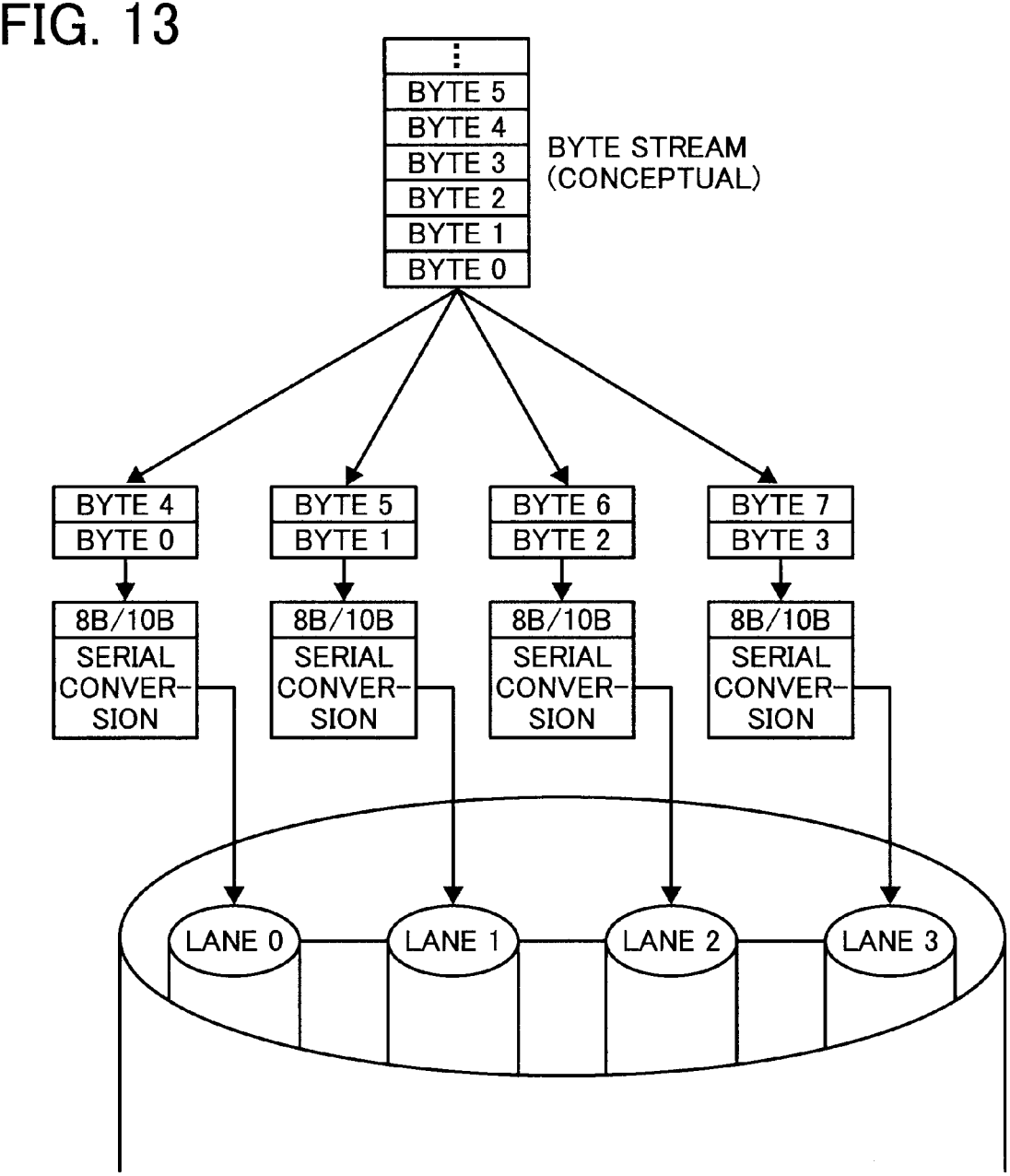
FIG. 13 is a schematic drawing of an example of byte striping on a x4 link.

In PCI Express, to avoid successive "0"s or "1"s (to avoid the state in which no cross point is present for a long time) 8B/10B conversion is used for data encoding. As shown in FIG. 13, serial conversion is applied to the converted data and is then transmitted from a least significant bit (LSB) onto a lane. Here, if a plurality of lanes are present (a x4 link is exemplified in FIG. 13), data is allocated to each lane in units of bytes before encoding. In this case, although this looks like a parallel bus at first sight, transferring is independently performed in each lane and, consequently, skewing being a problem in the parallel bus is greatly reduced.

To suppress power consumption of links, as shown in FIG. 14, link states L0/L0s/L1/L2 are defined.

L0 is a normal mode and power consumption is more lowered from the L0s to L2, but time requiring for recovery to L0 becomes longer. As shown in FIG. 15, by actively performing active-state power source management in addition to power source management by software, power consumption can be minimized as much as possible.

The main function of the electrical sub-block 157 in the physical layer 155 is to transmit data serialized by the logical sub-block 156 onto a lane and to receive data from a lane for transfer to the logical sub-block 156.

A capacitor for AC coupling is mounted at the transmission side of the link. With this, it is not necessary that a DC common mode voltage be the same at the transmission side and the reception side. Therefore, different designs, different semiconductor processes, and different power supply voltages can be used between the transmission side and the reception side.

As explained above, in PCI Express, the process is performed through 8B/10B encoding so as to avoid successive "0"s or "1"s as much as possible. However, there may be a case where successive "0"s or "1"s are present (at the maximum of five). In this case, it is stipulated that the transmission side execute de-emphasis transfer. When the same polarity bits continue, it is necessary that a noise margin of a signal received at the reception side be obtained by lowering the differential voltage level (amplitude) by 3.5±0.5 decibels from the second bit. This is called de-emphasis. For changing bits, with attenuation of frequency dependency on the transmission line, high frequency components are increased and the waveform at the reception side becomes small due to the attenuation. However, for unchanging bits, the high frequency components are decreased and the waveform at the reception side becomes relatively large. Therefore, de-emphasis is applied to make the waveform at the reception side constant.

The present embodiment uses Advanced Switching Interconnect utilizing the PCI Express technology. As a premise of the present invention, outlines of Advanced Switching Interconnect are explained.

In recent years, integration of computing and communication has advanced quickly, with the progress of broadband and semiconductor technology as a background. With this, a standard capable of widely supporting new applications system has been desired. To satisfy such desires, an Advanced Switching Interconnect (ASI) standard utilizing the PCI Express technology has emerged, and is assumed to be applied to a wide range of applications from computing to communication. Laying out and proliferating the ASI specification is managed by a non-profit organization, the Advanced Switching Interconnect Special Interest Group (ASI SIG).

A relation between a PCI Express and an ASI (Advanced Switching Interconnect) protocol stack is shown in FIG. 16. ASI (Advanced Switching Interconnect) can support a wider range of applications while adopting the technology regarding the physical layer and the link layer for PCI Express high-speed serial transmission, and its connection targets are assumed to be Chip-to-Chip and Board-to-Board. Although PCI transactions developed in computing have been inherited as they are in PCI Express, the PCI Express transaction layer is replaced in ASI (Advanced Switching Interconnect) for expanding the functions, thereby capable of supporting data flows and protocols at higher levels. Also, the connection structure has been expanded from the tree structure in PCI Express to allow a more flexible fabric structure, thereby also supporting a multi-CPU environment. In ASI (Advanced Switching Interconnect), a routing scheme has been significantly improved compared with other standards allowing a similar fabric structure (such as Ethernet (registered trademark) or Infiniband), and therefore the speed has been increased.

Figure 17:
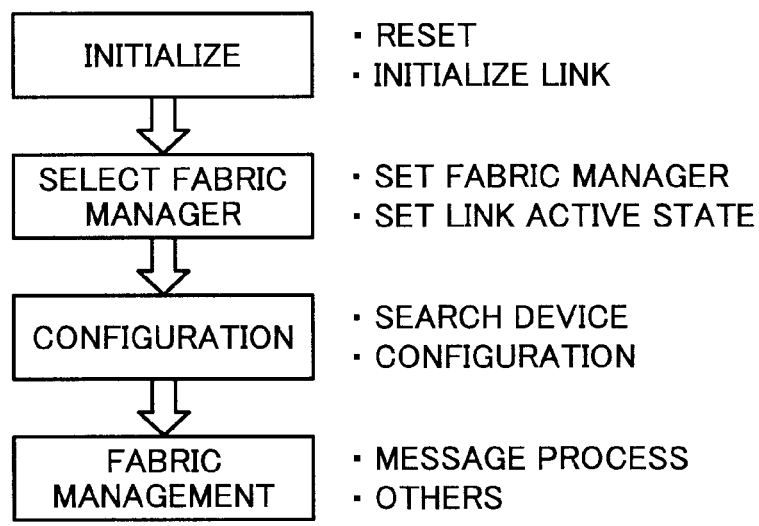
FIG. 17 is a drawing for explaining an initialization sequence in a fabric management function.

A fabric management function (AS Fabric Mngmnt) shown in FIG. 16 is part of the ASI (Advanced Switching Interconnect) protocol configured by software, supporting various services, such as setting up and removal of connection, event management, monitoring of performance and operation state, redundant route, path nullification, resource assignment, and load leveling. FIG. 17 is a drawing of an initialization sequence in the fabric management function.

Figure 18:
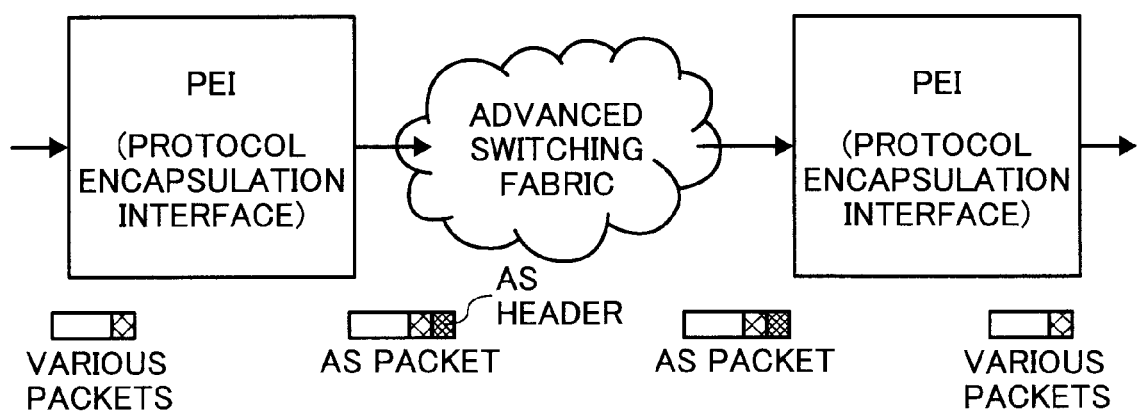
FIG. 18 is a drawing for explaining encapsulation of a protocol in Advanced Switching Interconnect.

In ASI (Advanced Switching Interconnect), as shown in FIG. 18, a scheme of encapsulating various protocol is adopted, thereby trying to increase the speed of higher-level protocol services (such as Transmission Control Protocol/Internet Protocol (TCP/IP) and Fibre Channel). ASI (Advanced Switching Interconnect) has an upper layer where there is a portion called Protocol Encapsulation Interface (PEI) having a function of adding an ASI header to various packets arriving from the outside for conversion to ASI packets. The packet passing through the ASI fabric has removed therefrom its ASI header by PEI at the reception side, and is then extracted as the original packet. An upstream protocol interface is called PI adopting a mechanism that can support various standards and can also implement AS Native and Vendor specific protocols. A profile for connecting PCI Express and ASI (Advanced Switching Interconnect) through a bridge and encapsulating the PCI Express protocol for transfer is defined as PI-8.

ASI (Advanced Switching Interconnect) includes features of PCI Express, such as high speed, bandwidth scalability, expandability of the physical layer with the hierarchical configuration, and data reliability, as well as the following features unique to ASI (Advanced Switching Interconnect):

Support for unreliable (lossy) packet transmission, such as moving pictures;
Support for multicast and broadcast packets;
Multi-protocol transmission through encapsulation;
Adoption of high-speed unique path routing scheme;
Support for congestion management function; and
Support for fabric structure.

Figure 19:
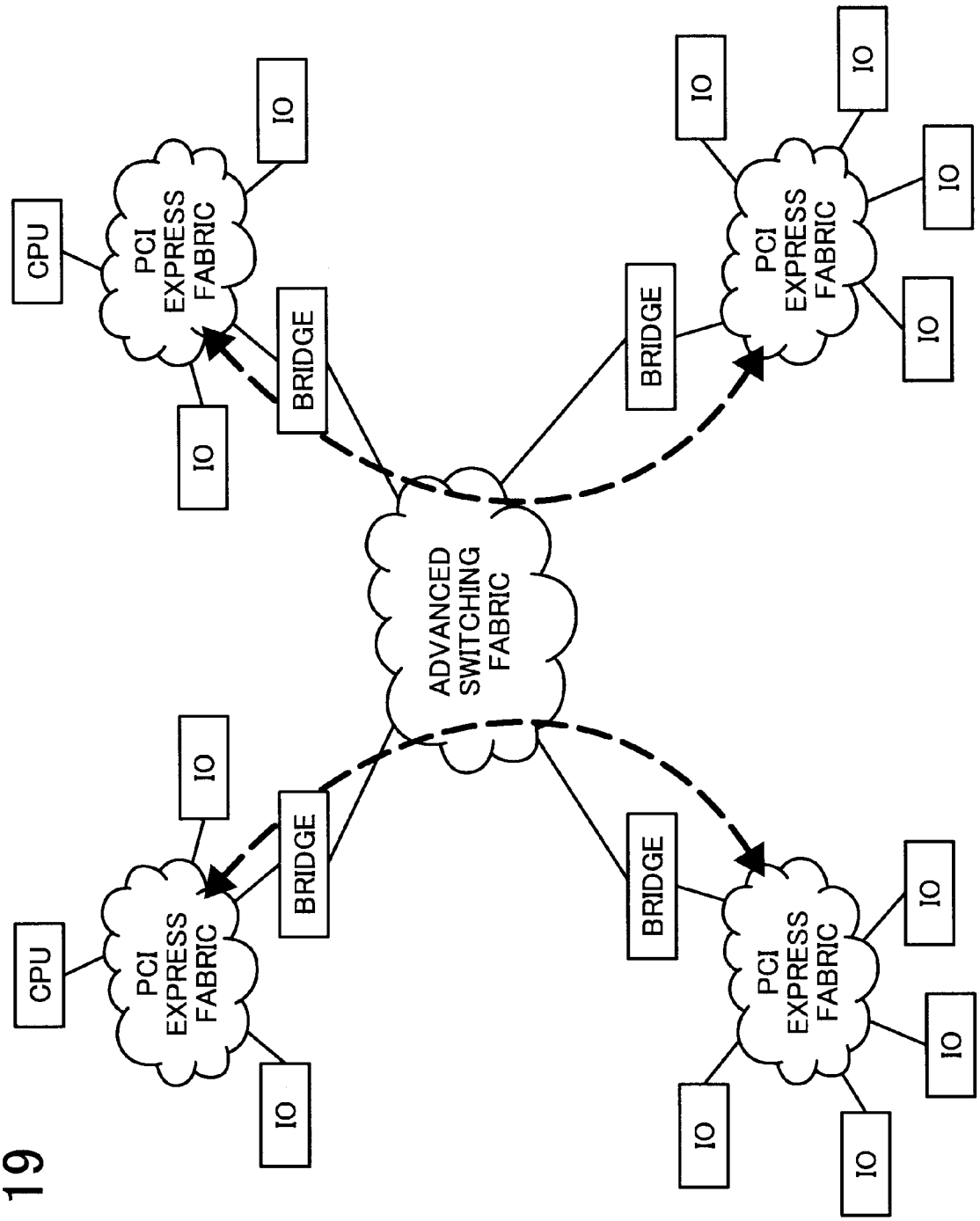
FIG. 19 is a drawing for explaining sharing of storages or I/O resources among a plurality of devices through Advanced Switching Interconnect.
Figure 20:
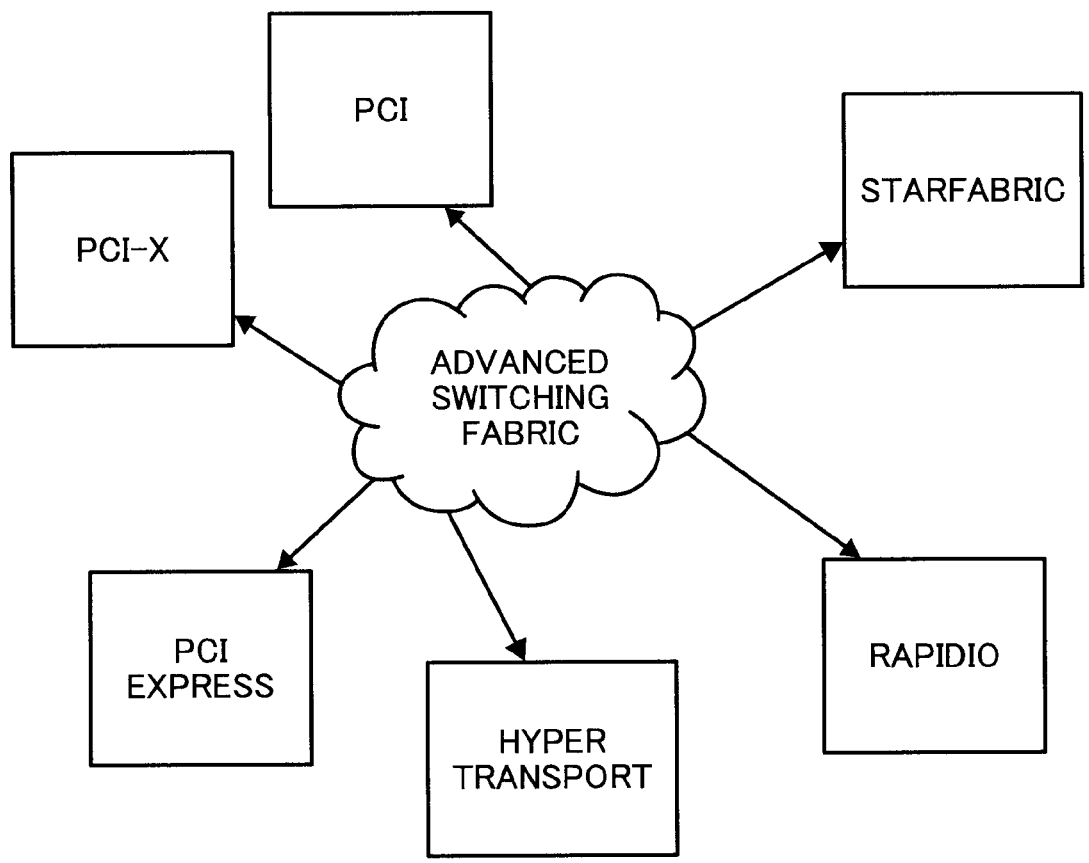
FIG. 20 is a drawing for explaining a communication example through Advanced Switching Interconnect.

Such features allow sharing of storages and I/O resources among a plurality of devices as shown in FIG. 19. In contrast to the standards, such as PCI, PCI-X, PCI Express, HyperTransport, RadioIO, and StarFabric, requiring a complex connecting means because of different physical layers even the same load/store protocol is used, the use of the ASI (Advanced Switching Interconnect) technology also allows mutual communication as shown in FIG. 20 to be achieved in a simple manner, thereby increasing the speed of communication between devices. Furthermore, by tunneling through various upper protocols, a local system achieving communication such as TCP/IP at higher speed than that of normal Ethernet processing can be configured. Still further, redundancy is provided to the system by supporting the fabric structure so as to increase robustness, and also dynamic routing path switching can be performed.

In addition, Advanced Switching Interconnect has the physical layer and the data link layer of PCI Express superposed with an optimized transaction layer, thereby providing various functions. Characteristic features of the transaction layer include multilevel Quality of Service (QoS). The QoS supports 20 virtual channels (VCs) and eight traffic classes (TCs).

The fabric management function (AS Fabric Mngmnt), which is upper software for controlling ASI (Advanced Switching Interconnect), can differentiate (assign priorities to) traffics by using traffic classes (TCs). For example, video data can be transferred with priority over network data. The traffic classes (TC) are classified into eight classes TC0 to TC7

The virtual Channels (VCs) are virtual communication buses independent from one another (with a mechanism in which a plurality of independent data flow buffers sharing the same link are used) and each have a resource (a buffer and a queue). The virtual channels each perform independent flow control. With this, even if a buffer of one virtual channel is full, a transfer with another virtual channel can be performed. That is, the physically single link can be effectively used by being divided into a plurality of virtual channels.

In the transaction layer, the Traffic Classes (TCs) are mapped to the Virtual Channels (VCs). To one Virtual Channel (VC), one or plurality of Traffic Classes (TCs) can be mapped (when the number of Virtual Channels (VCs) is small). For example, in a simple case, a Traffic Class (TC) can be mapped to each Virtual Channel (VC) in a one-to-one relationship, and all Traffic Classes (TCs) can be mapped to the virtual channel VC0. TC0-VC0 mapping is indispensable/fixed, and other mapping is controlled by the upper software. By using the Traffic Classes (TCs), the software can control the priorities of transactions.

In the ASI fabric, a Congestion state may occur due to the occurrence of excessive traffics. When the state falls into a Congestion state, a packet response time is increased, thereby posing a problem that it is impossible to keep a certain service level. To solve this problem, in the ASI (Advanced Switching Interconnect) standard, Status-Based Flow Control (SBFC) is provided as a Congestion Management function.

Figure 21A:
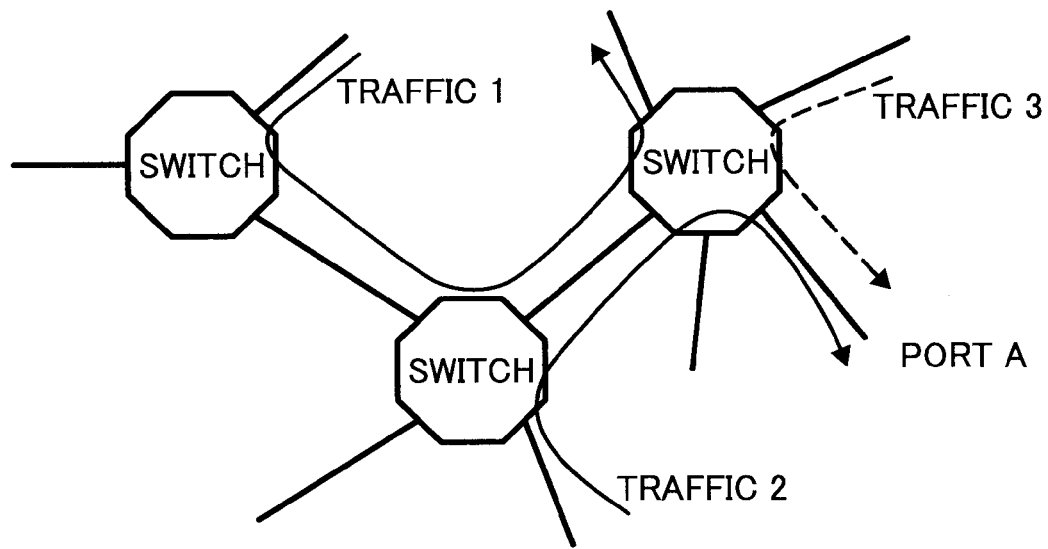
FIGS. 21A and 21B are drawings for explaining Congestion Management.

As shown in FIG. 21A, in the case where traffics 1 to 3 are present at three switches, it is assumed that desired data transfer is carried out over traffic 1 and traffic 2. When the traffic 3 occurs, which is an excessive traffic more than the capability of a port A, this effect appears as a decrease of traffic 2 to the same output port A. Also, not only traffic 2 but also traffic 1 passing through the same link to be used by traffic 2 is decreased.

Figure 21B:
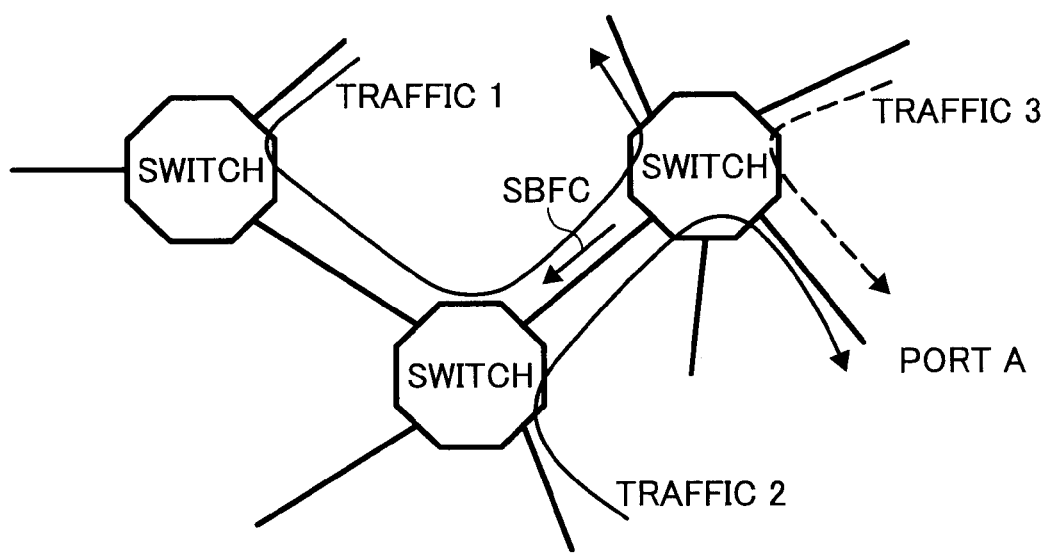

Thus, as shown in FIG. 21B, by using SBFC to notify the next switch of the fact that the port A is congested, traffic 1 is prevented from being affected by traffic 2.

Figure 22:
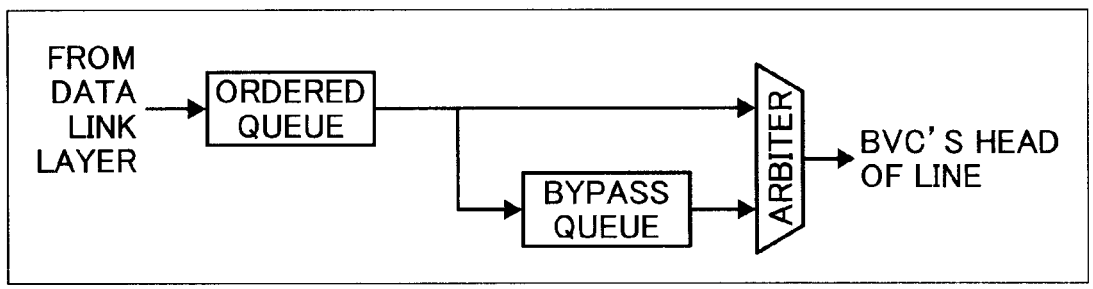
FIG. 22 is a schematic drawing for explaining Bypass Capable Unicast (BVC)

There are three types of virtual channels (VCs) in ASI (Advanced Switching Interconnect) as follows.
Bypass Capable Unicast (BVC): VC Ids 0-7
Ordered-Only Unicast (OVC): VC Ids 8-15
Multicast (MVC): VC Ids 16-19
In Bypass Capable Unicast (BVC), as shown in FIG. 22, a previously input queue is bypassed, thereby allowing a subsequently input queue to exit from an arbiter (arbitrating circuit).

Figure 23:
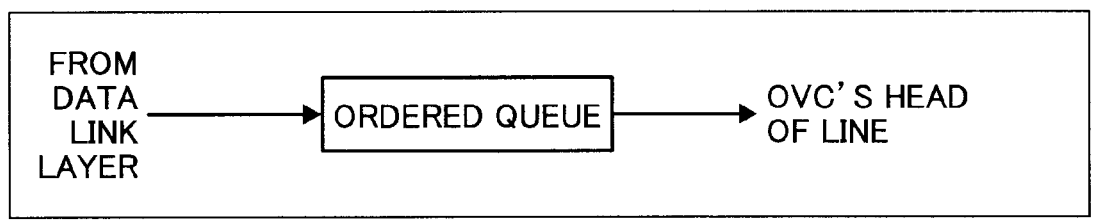
FIG. 23 is a schematic drawing for explaining Ordered-Only Unicast (OVC)

In Ordered-Only Unicast (OVC), as shown in FIG. 23, a previously input queue is output as it is.

Figure 24:
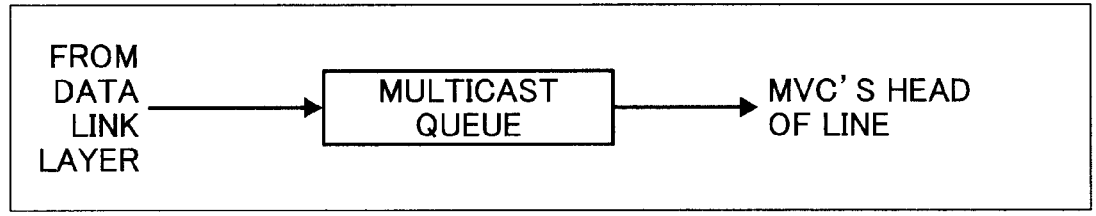
FIG. 24 is a schematic drawing for explaining Multicast (MVC)

In Multicast (MVC), as shown in FIG. 24, an input queue is subjected to multicast output.

Figure 25:
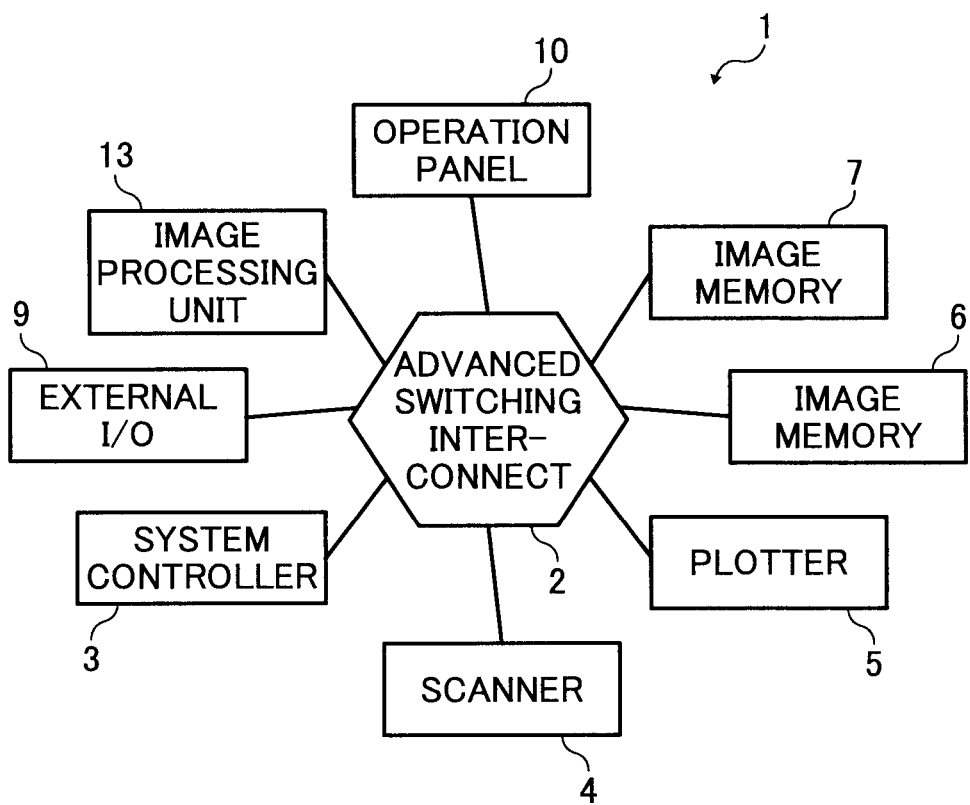
FIG. 25 is a schematic block diagram of a configuration example of an information processing apparatus according to a first embodiment of the present invention.

FIG. 25 is a schematic block diagram of a configuration example of an information processing apparatus 1 according to a first embodiment of the present invention. The information processing apparatus 1 according to the present embodiment is applied to equipment, such as Multifunction product (MFP). In the information processing apparatus 1, various end point devices and switch output ports (hereinafter, "devices") are connected together through ASI (Advanced Switching Interconnect) 2, which is a high-speed serial switch fabric. As various devices connected to the ASI 2, a system controller 3, a scanner 4 as an image input device, a plotter 5 as an image output device, a first image memory 6 as a storage device, a second image memory 7 as a storage device, an image processing unit 13, an external I/O 9, and an operation panel 10 are connected together.

The system controller 3 includes a Central Processing Unit (CPU) in charge of controlling the entire apparatus according to a program (software) installed therein, and represents a device portion (printer controller) that performs processes, such as route control and route determination.

The scanner 4 represents a device or unit portion for taking image data based on a document image or the like into the system, and includes, for example, a scanner engine that photoelectrically reads the document image to obtain image data, and others.

The plotter 5 represents a device or unit portion for print output of image data onto paper or the like, and includes, for example, an electrophotographic plotter (printer) engine, and others. Here, various schemes can be used as a printing scheme of the plotter 5, including electrophotography, ink jet, dye-sublimation thermal transfer, silver halide photography, direct thermal recording, and thermofusible transfer.

The image memories 6 and 7 are Hard Disk Drives (HDDs) or Random Access Memories (RAMs), for example, storing image data read by the scanner 4.

The external I/O 9 performs exchange of image data, control data, and other data with another connected device.

The operation panel 10 includes a touch panel or a display panel, thereby accepting inputs of various instructions to the apparatus.

The image processing unit 13 performs various image processes to the image data read by the scanner 4 according to a user instruction or the characteristics of the information processing apparatus 1. The image processing unit 13 outputs image data after processing to the plotter 5.

The information processing apparatus 1 according to the present embodiment gives traffic priorities to various devices for assignment to different Virtual Channels (VCs). This is explained in detail below.

Figure 26B:
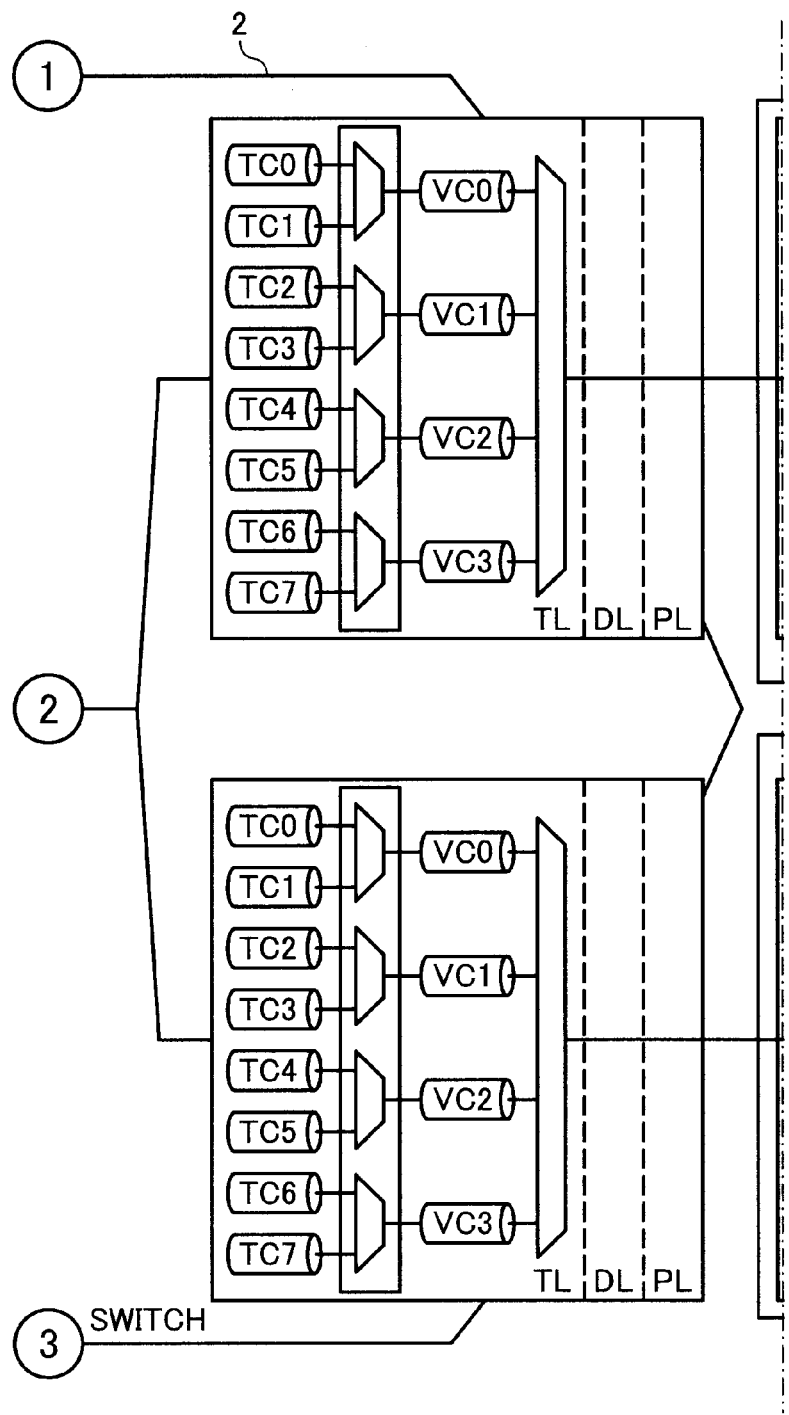
Figure 26B:
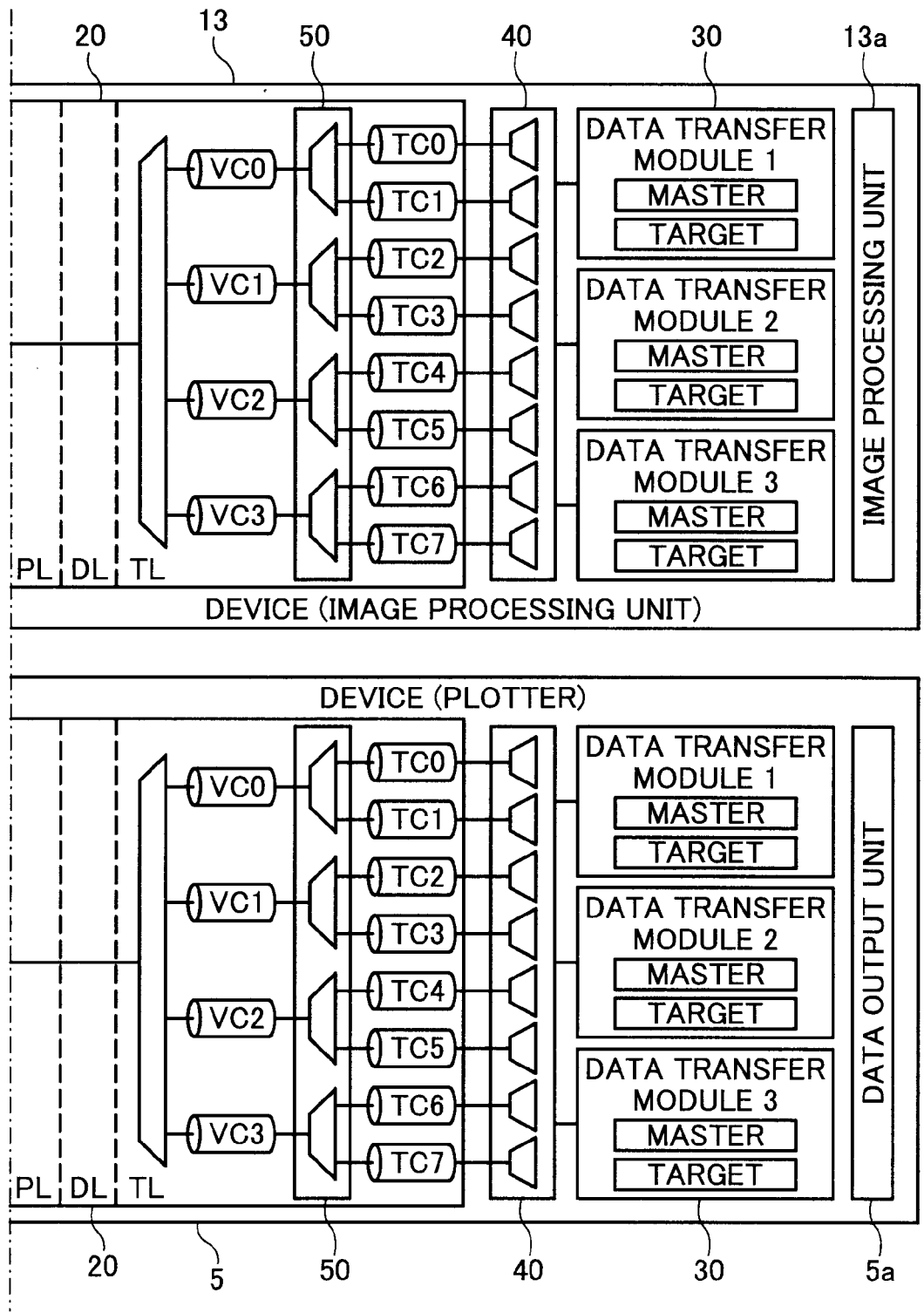

FIGS. 26A and 26B are block diagrams that partially depicts the configuration of the information processing apparatus 1 of FIG. 25 in detail. In FIGS. 26A and 26B, in particular, a state is depicted in which the scanner 4, the image processing unit 13, and the plotter 5 are connected through the ASI 2. Each device is configured of: a communication core 20 composed of a Transaction Layer (TL), a Data Link Layer (DL), and a Physical layer (PL); a function unique to the device other than the communication core (a data input unit 4a for the scanner 4; an image process unit 13a for the image processing unit 13; and a data output unit 5a for the plotter 5), a data transfer module 30, and a traffic-class setting unit 40.

The traffic-class setting unit 40 has a function of assigning a traffic occurring at each data transfer module 30 to a traffic class.

The Transaction Layer (TL) of the communication core 20 includes a channel setting unit 50 for assigning a Traffic Class (TC) to a Virtual Channel (VC).

The traffic-class setting unit 40 and the channel setting unit 50 may be configured, as shown in FIGS. 26A and 26B, to allow assignment to be freely controlled, or may be configured so that association is narrowed down so as to make a traffic from the data transfer module 30 is uniquely determined with respect to a Virtual Channel (VC).

Figures 27, 27A:
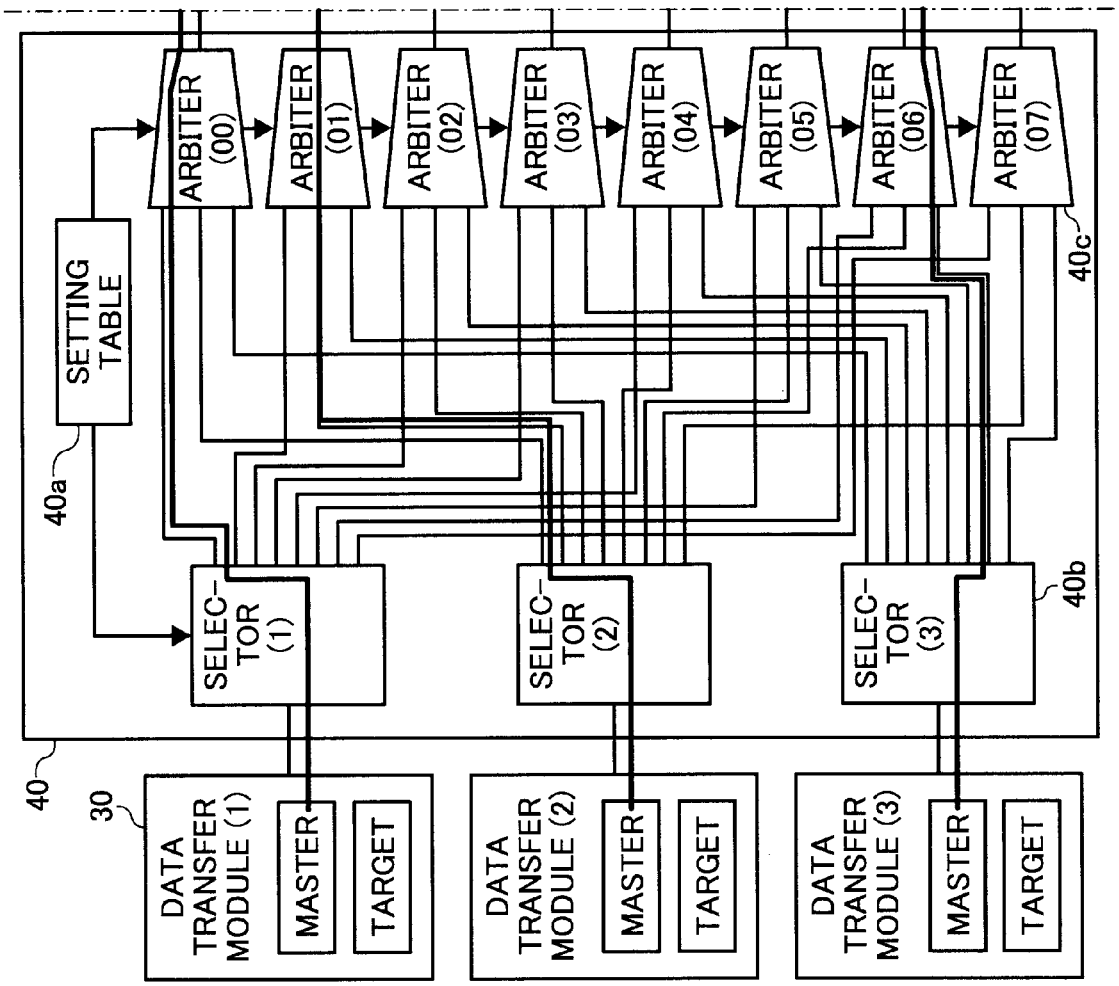
FIG. 27 is a block diagram of a detailed configuration of a device.
Figure 27B:
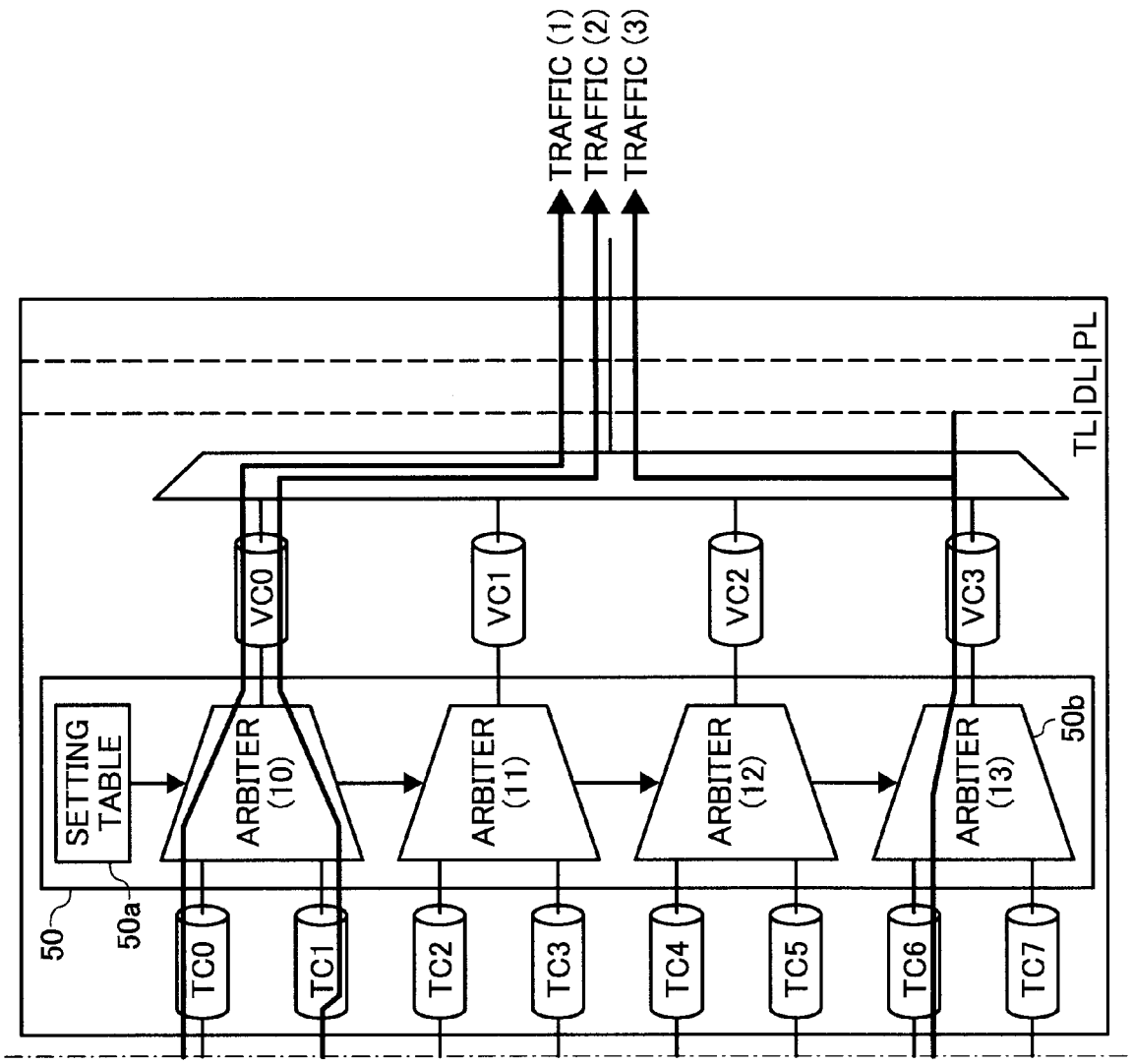

FIG. 27 is a block diagram of a detailed configuration of the device. The operation of each unit forming the device is explained in detail with reference to FIG. 27. Here, in FIG. 27, traffics are exemplarily depicted.

The traffic-class setting unit 40 includes a setting table 40a, a selector 40b, and an arbiter 40c. In the configuration shown in FIG. 27, the traffic of each data transfer module 30 can be set at any of the Traffic Classes (TCs). Alternatively, a configuration in which the minimum necessary association can be achieved does not pose a problem. In this case, all what is required is to provide only the minimum number of selectors 40b and arbiters 40c.

Figures 28, 29:
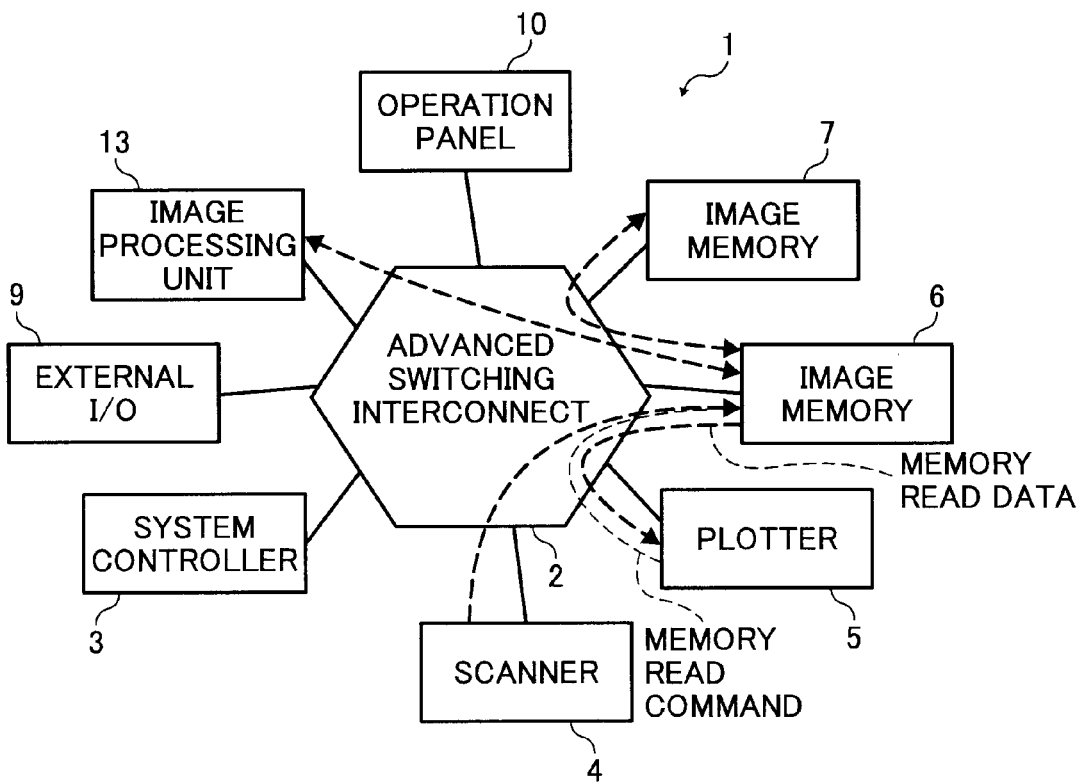
FIG. 28 is a schematic drawing of one example of a setting table.
FIG. 29 is a schematic block diagram of one example of transaction priority control in a copy operation.

FIG. 28 is a schematic drawing of one example of the setting table 40a. As shown in FIG. 28, the setting table 40a stores a Traffic Class (TC) to be set by the traffic-class setting unit 40 for each traffic (for each type of a command of the traffic). In the example of FIG. 28, a data transfer module (1) and a data transfer module (2) issue a memory write command, whilst a data transfer module (3) issues a memory read command. According to the present embodiment, the Traffic Class (TC) to be associated is determined for each type of the command of the traffic. Therefore, to assign the data transfer module (1) and the data transfer module (2) to TC0, the setting table 40a issues "0", which is a control command to a selector (1) and a selector (2). To assign the data transfer module (3) to TC6, the setting table 40a issues "6", which is a control command to a selector (3).

The channel setting unit 50 includes a setting table 50a and an arbiter 50b. In the configuration shown in FIG. 27, only the minimum necessary association can be achieved. Alternatively, so as to be able to set traffics of each Traffic Class (TC) to all Virtual Channels (VCs), a selector may be provided for each Traffic Class (TC). In this case, as with the traffic-class setting unit 40, the channel setting unit 50 includes a setting table, a selector, and an arbiter.

To assign a traffic (1) occurring at the data transfer module (1) to TC0, a control signal is sent from the setting table 40a of the traffic-class setting unit 40 to the selector (1) and an arbiter (00). The selector (1) selects an output port based on the received control signal, and notifies the arbiter (00) of the traffic (1). The arbiter (00) performs arbitration of the input signal based on the control signal from the setting table 40a, although no conflicting traffic is input in the example shown in FIG. 27. As a result, the traffic (1) is assigned to TC0.

Similarly, to assign a traffic (2) occurring at the data transfer module (2) to TC1, a control signal is sent from the setting table 40a of the traffic-class setting unit 40 to the selector (2) and an arbiter (01). The selector (2) selects an output port based on the received control signal, and notifies the arbiter (01) of the traffic (2). The arbiter (01) performs arbitration of the input signal based on the control signal from the setting table 40a, although no conflicting traffic is input in the example shown in FIG. 27. As a result, the traffic (2) is assigned to TC1.

Similarly, to assign a traffic (3) occurring at the data transfer module (3) to TC6, a control signal is sent from the setting table 40a of the traffic-class setting unit 40 to the selector (3) and an arbiter (06). The selector (3) selects an output port based on the received control signal, and notifies the arbiter (06) of the traffic (3). The arbiter (06) performs arbitration of the input signal based on the control signal from the setting table 40a, although no conflicting traffic is input in the example shown in FIG. 27. As a result, the traffic (3) is assigned to TC6.

Traffics of TC0 (traffic (1)) and TC1 (traffic (2)) are input to an arbiter (10). The arbiter (10) performs arbitration of the input signal based on the control signal form the setting table 50a. As a result, the traffics of TC0 (traffic (1)) and TC1 (traffic (2)) are assigned to VC0.

Similarly, traffics of TC6 (traffic (3)) and TC7 (no traffic) are input to an arbiter (13). The arbiter (13) performs arbitration of the input signal based on the control signal form the setting table 50a, although no conflicting traffic is input in the example shown in FIG. 27. As a result, the traffic of TC6 (traffic (3)) is assigned to VC3.

Examples of traffic classification regarding data communication between devices are as follows:

LSYNC isochronous restriction

Traffic 1 the scanner 4→the image memory 6 (7)

Traffic 2 the image memory 6 (7)→the plotter 5

Page isochronous restriction

Traffic 3 the image memory 6 (7)→the image memory 7 (6)

Traffic 4 the image memory 6 (7)→the image processing unit 13

Traffic 5 the image process unit 13→the image memory 6 (7)

Then, for each traffic classified as above, a traffic class is used to give a priority of data communication. The priorities of the data communication are determined by the traffic-class setting unit 40 as:

Traffic 2>Traffic 1>Traffics 3, 4, and 5.

That is, in data communication between devices, a traffic with a higher LSYNC isochronous restriction is subjected to data communication with a higher priority. Each Traffic Class (TC) with its priority of data communication determined has a Virtual Channel (VC) mapped by the channel setting unit 50. It is assumed according to the present embodiment that one Traffic Class (TC) is mapped to one Virtual Channel (VC). With this, the fabric management function (AS Fabric Management), which is upper software controlling ASI (Advanced Switching Interconnect), can control the priorities of transactions by using the Traffic Classes (TC).

The case of a copy operation as shown in FIG. 29 is considered, in which data read by the scanner 4 of the information processing apparatus 1 is transferred to the memory 6 and the image data stored in the image memory 6 is then output from the plotter 5. In this case, a memory write command for the image data is preferably issued after all memory read commands for the image data are issued. This is because, if the memory read command is not prioritized, in view of timing restriction of line synchronous transfer, the memory read command may not be received within a line effective period.

Thus, when a conflict between a memory read command and a memory write command occurs at the ASI (Advanced Switching Interconnect) 2, the following priorities of traffics in the virtual channels are followed, thereby handling high-speed data transfer:

Traffic 2 (memory read command)>Traffic 1 (memory write command).

In this manner, according to the present embodiment, a traffic class is set for each traffic at the devices 3 to 10 where a conflict occurs, and a different virtual channel is assigned to each set traffic class to give a priority of data communication, thereby freely expanding the devices 3 to 10 having various traffics of different characteristics with respect to ASI (Advanced Switching Interconnect)2, which is a high-speed serial switch fabric.

A second embodiment of the present invention is explained below with reference to FIGS. 30 to 33. Portions identical to those in the first embodiment are provided with the same reference numerals and are not explained herein.

Figure 30:
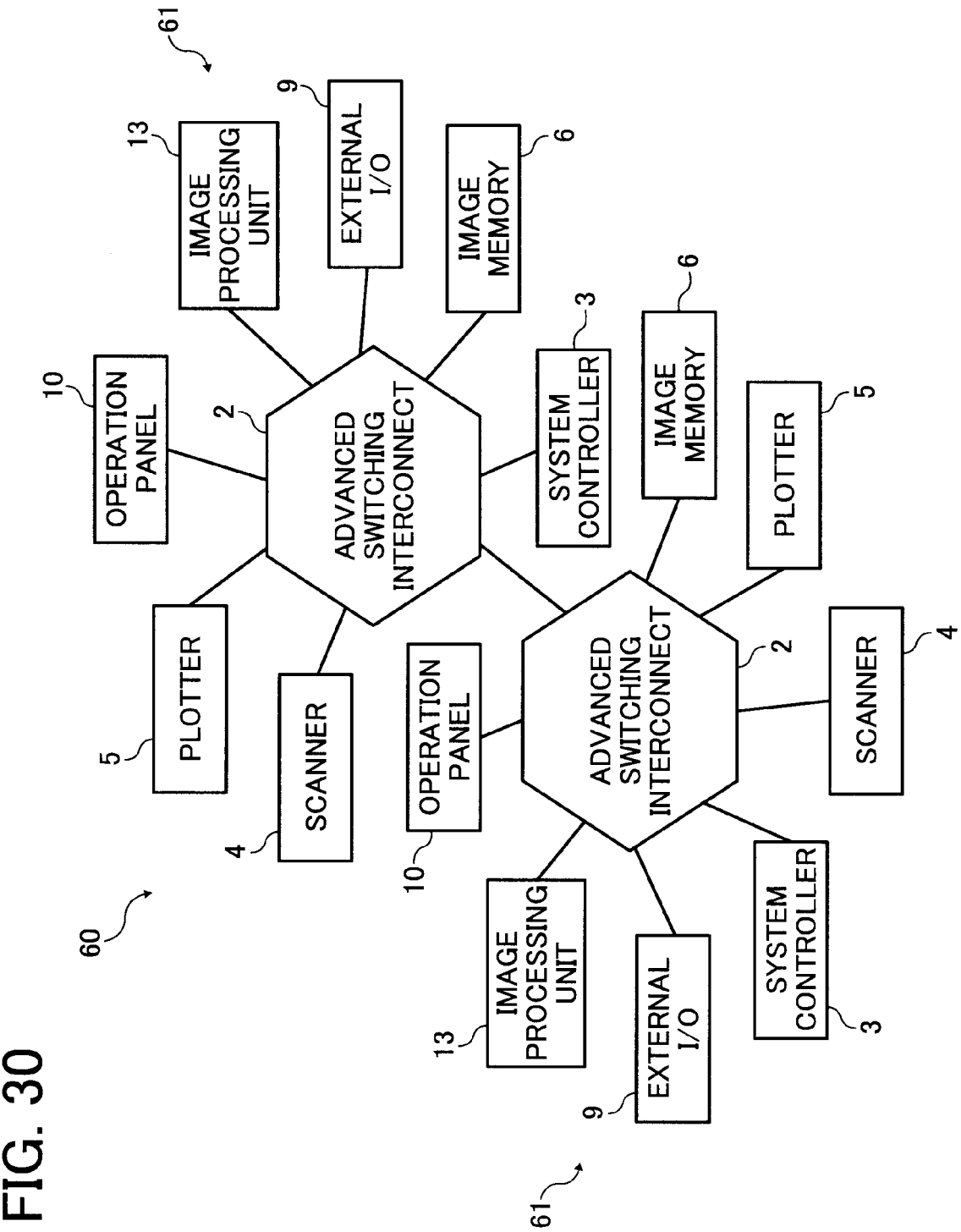
FIG. 30 is a schematic block diagram of a configuration example of an information processing system according to a second embodiment of the present invention.

FIG. 30 is a schematic block diagram of a configuration example of an information processing system 60 according to the present embodiment. In the information processing system 60 according to the present embodiment, information processing apparatuses 61 including a single image memory 6 are coupled via ASI (Advanced Switching Interconnect).

Figure 31:
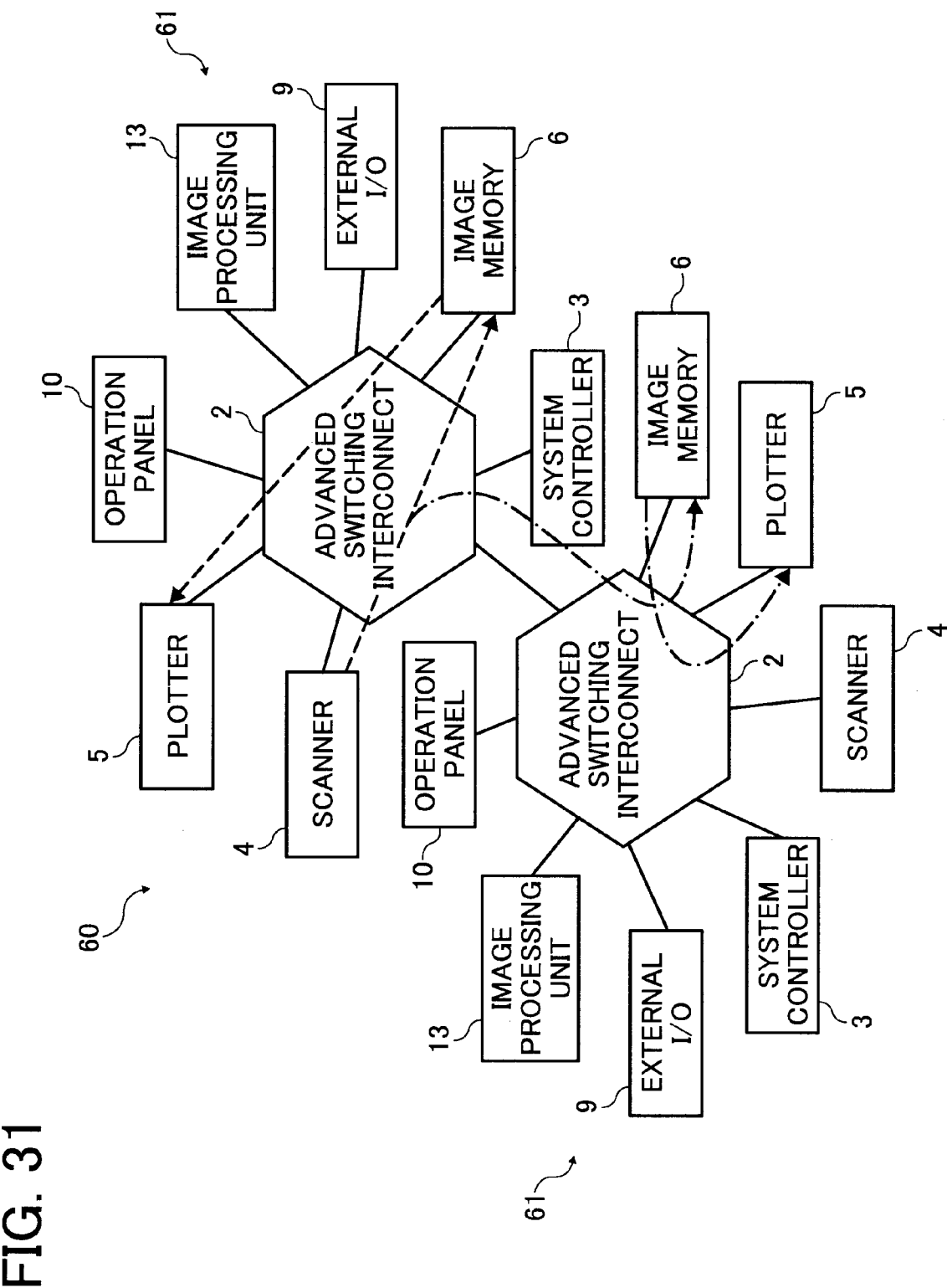
FIG. 31 is a schematic block diagram of one example of transaction priority control in a copy operation.

In such a configuration, consider the case as shown in FIG. 31 in which both information processing apparatuses 61 perform a copy operation, that is, the case in which data read by the scanner 4 of one of the information processing apparatuses 61 is transferred to the image memory 6 of each information processing apparatus 61 through multicast output and the image data stored in the image memory 6 of each information processing apparatus 61 is output from the plotter 5 of each information processing apparatus 61. In this manner, data transfer to the image memory 6 of each information processing apparatus 61 can solve a problem of, for example, latency (a delay time taken from a request for data until the data is actually transferred) by using the image memory 6 included in each apparatus.

Also in this case, at ASI (Advanced Switching Interconnect) 2 of each information processing apparatus 61, a conflict between a memory read command and a memory write command occurs. To get around this, the following priorities of traffics in the virtual channels are followed, thereby handling high-speed data transfer:

Traffic 2 (memory read command)>Traffic 1 (memory write command).

Figure 32:
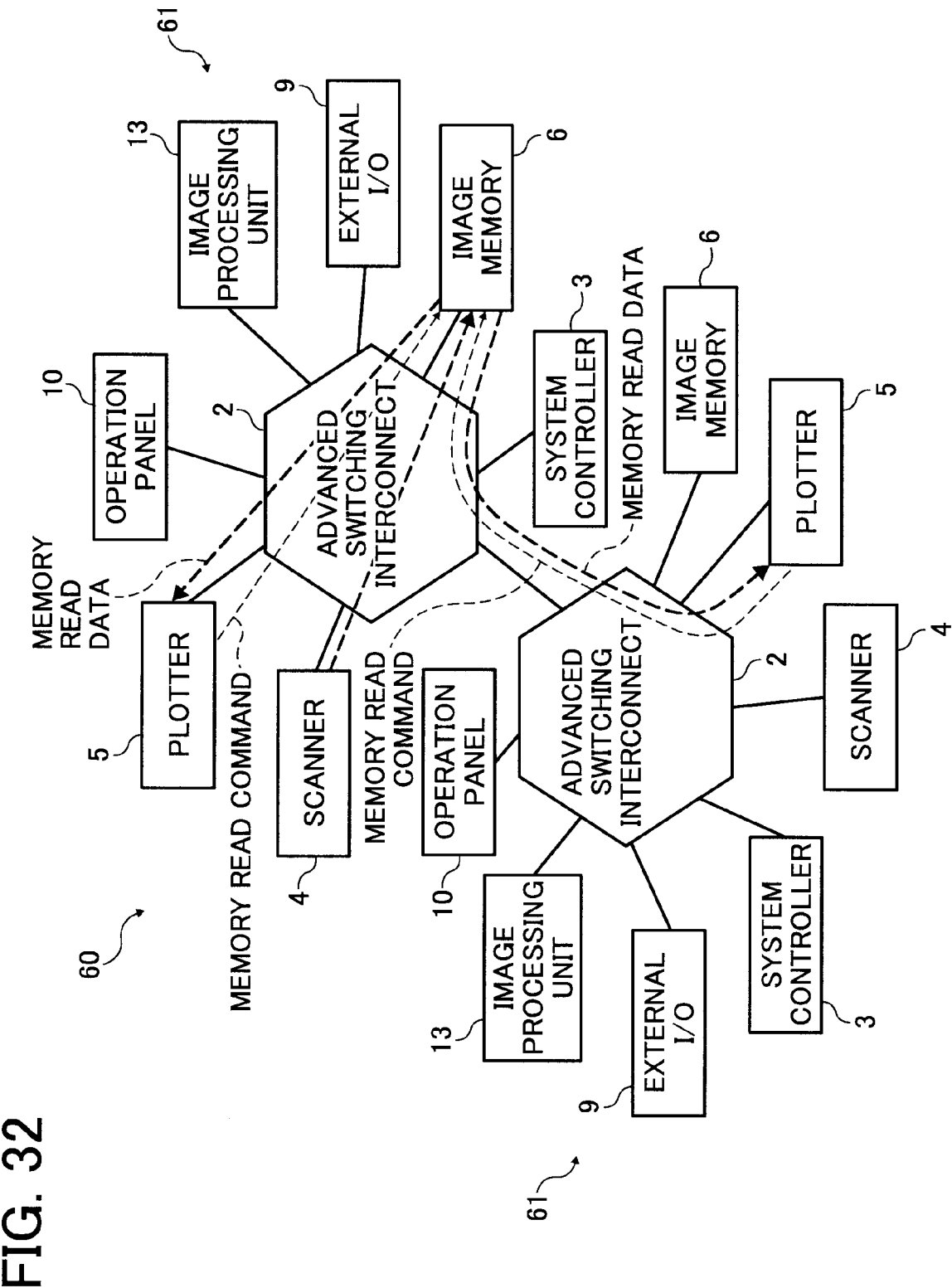
FIG. 32 is a schematic block diagram of another example of transaction priority control in a copy operation.

The case of a copy operation at both information processing apparatuses 61 as shown in FIG. 32 is considered, in which data read by the scanner 4 of one of the information processing apparatuses 61 is transferred to the image memory 6 of the one information processing apparatus 61 and the plotter 5 of each information processing apparatus 61 issues a memory read command to output the image data stored in the image memory 6. In this manner, data transfer to only the image memory 6 of one of the information processing apparatuses 61 can reduce memory consumption.

Also in this case, at ASI (Advanced Switching Interconnect) 2 of the information processing apparatus 61, a conflict between a memory read command and a memory write command occurs. To get around this, the following priorities of traffics in the virtual channels are followed, thereby handling high-speed data transfer:

Traffic 2 (memory read command)>Traffic 1 (memory write command).

Figure 33:
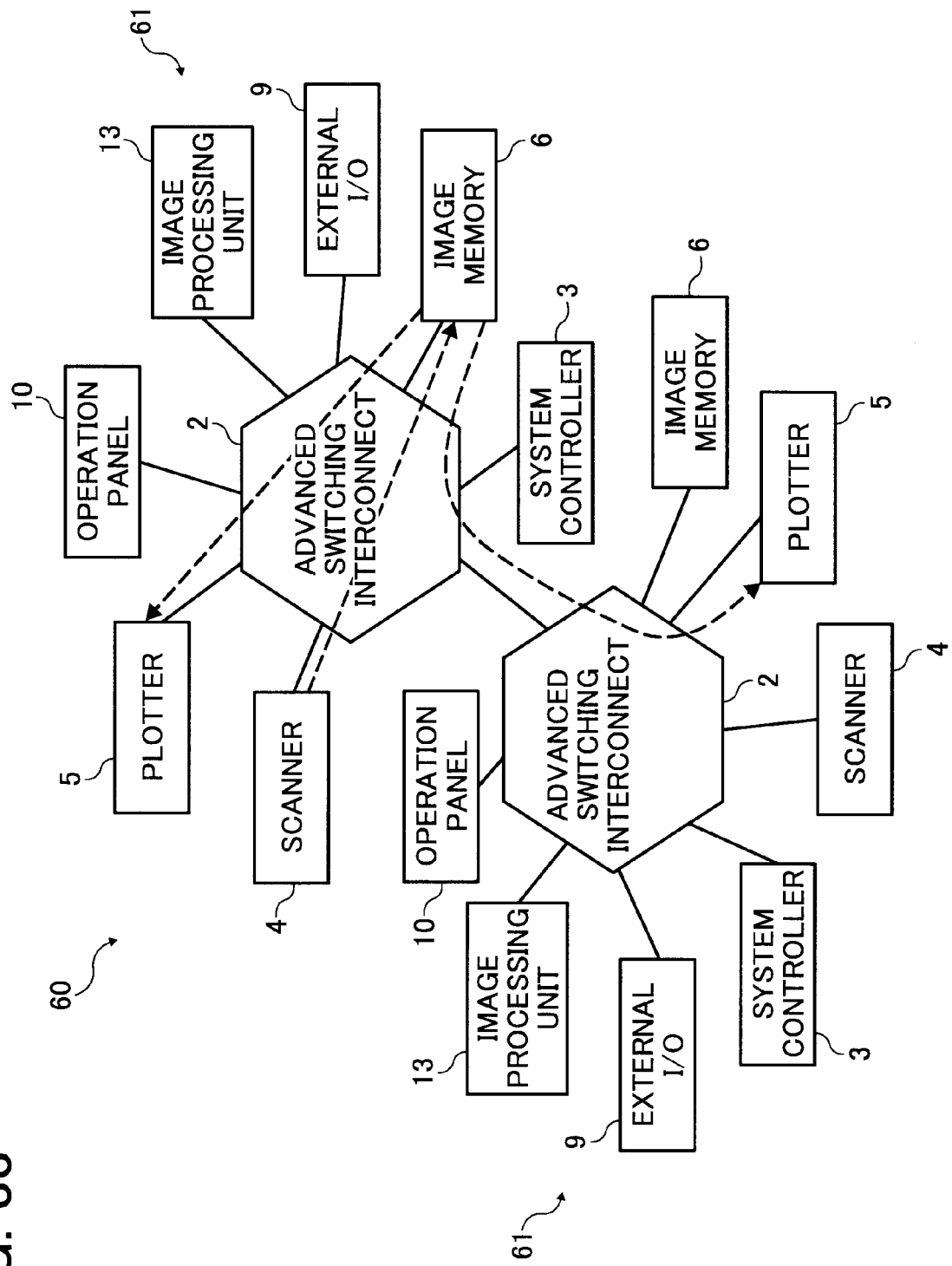
FIG. 33 is a schematic block diagram of still another example of transaction priority control in a copy operation.

The case of a copy operation at both information processing apparatuses 61 as shown in FIG. 33 is considered, in which data read by the scanner 4 of one of the information processing apparatuses 61 is transferred to the image memory 6 of the one information processing apparatus 61 and memory write transfer is caused to occur for the image data stored in the image memory 6 through multicast output, thereby outputting the image data from the plotter 5 of each information processing apparatus 61. In this manner, memory write transfer is caused to occur through multicast output, thereby reducing traffics compared with the case where the plotter 5 of each information processing apparatus 61 issues a memory read command to its own image memory 6.

Also in this case, at ASI (Advanced Switching Interconnect) 2 of the information processing apparatus 61, a conflict between a memory read command and a memory write command occurs. To get around this, the following priorities of traffics in the virtual channels are followed, thereby handling high-speed data transfer:

Traffic 2 (memory read command)>Traffic 1 (memory write command).

A third embodiment of the present invention is explained with reference to FIGS. 34 to 38. Here, portions identical to those in the first embodiment or the second embodiment are provided with the same reference numerals and are not explained herein.

Figure 34:
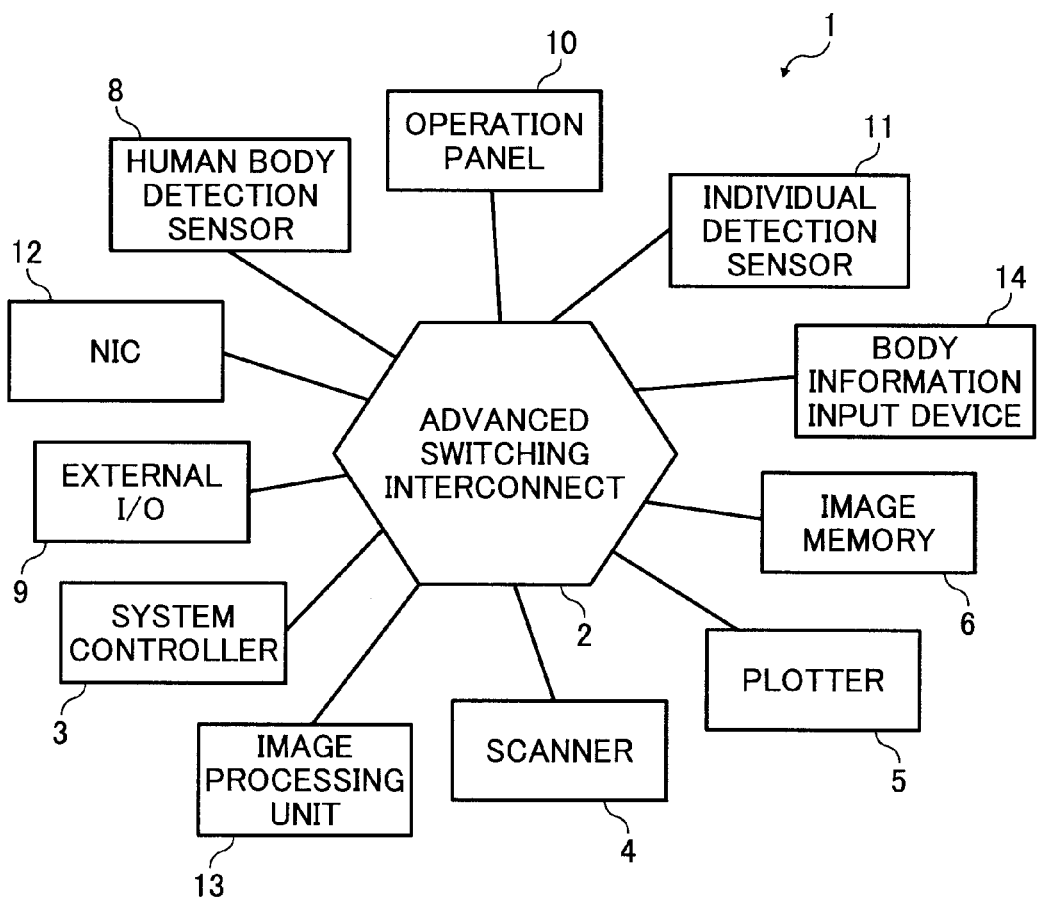
FIG. 34 is a schematic block diagram of a configuration example of an information processing apparatus according to a third embodiment of the present invention.

FIG. 34 is a schematic block diagram of a configuration example of the information processing apparatus 1 according to the present embodiment. The information processing apparatus 1 according to the present embodiment is applied to equipment, such as an MFP. In the information processing apparatus 1 according to the present embodiment, various end point devices and switch output ports (hereinafter, "devices") are connected together through ASI (Advanced Switching Interconnect) 2, which is a high-speed serial switch fabric. Here, as various devices connected to the ASI 2, the system controller 3, the scanner 4, the plotter 5, the image memory 6, a body-information input device 14, a human-body detection sensor 8, an individual detection sensor 11, the operation panel 10, the external I/O 9, a Network Interface Controller (NIC) 12, and the image processing unit 13.

The system controller 3 includes a Central Processing Unit (CPU) in charge of controlling the entire apparatus according to a program (software) installed therein, and represents a device portion (printer controller) that performs processes, such as route control and route determination.

The scanner 4 represents a device or unit portion for taking image data based a document image or the like into the system, and includes, for example, a scanner engine that photoelectrically reads the document image to obtain image data, and others.

The plotter 5 represents a device or unit portion for print output of image data onto paper or the like, and includes, for example, an electrophotographic plotter (printer) engine, and others. Here, various schemes can be used as a printing scheme of the plotter 5, including electrophotography, ink jet, dye-sublimation thermal transfer, silver halide photography, direct thermal recording, and thermofusible transfer.

The image memory 6 is a Hard Disk Drive (HDD) or Random Access Memory (RAM), for example, storing image data read by the scanner 4.

The body-information input device 14 causes a user to enter biometrics information, such as a fingerprint, iris image, face, and vein, for use in personal authentication. The human-body detection sensor 8 detects a change in temperature caused by a motion of a person. When it is detected by the human-body detection sensor 8 that nobody is near here, the apparatus is caused to be in a wait state, thereby achieving power saving. The individual detection sensor 11 identifies individual information (attributes) through communication with an electronic tag (radiofrequency identification (RFID)) attached to an identification (ID) card owned by the user.

The operation panel 10 includes a touch panel or a display panel, thereby accepting inputs of various instructions to the apparatus.

The external I/O 9 performs exchange of image data, control data, and other data with another connected device.

The NIC 12 is connected to a network, such as a Local Area Network (LAN) or the Internet, to exchange image data, control data, and other data with another device connected to the network according to a communication protocol.

The image processing unit 13 performs various image processes to the image data read by scanner 4 according to a user instruction or the characteristics of the information processing apparatus 1. The image processing unit 13 outputs image data after processing to the plotter 5.

The information processing apparatus 1 according to the present embodiment classifies data communication between devices into groups according to a predetermined condition and gives traffic priorities to various devices for assignment to different Virtual Channels (VCs). This is explained in detail below.

Figure 35A:
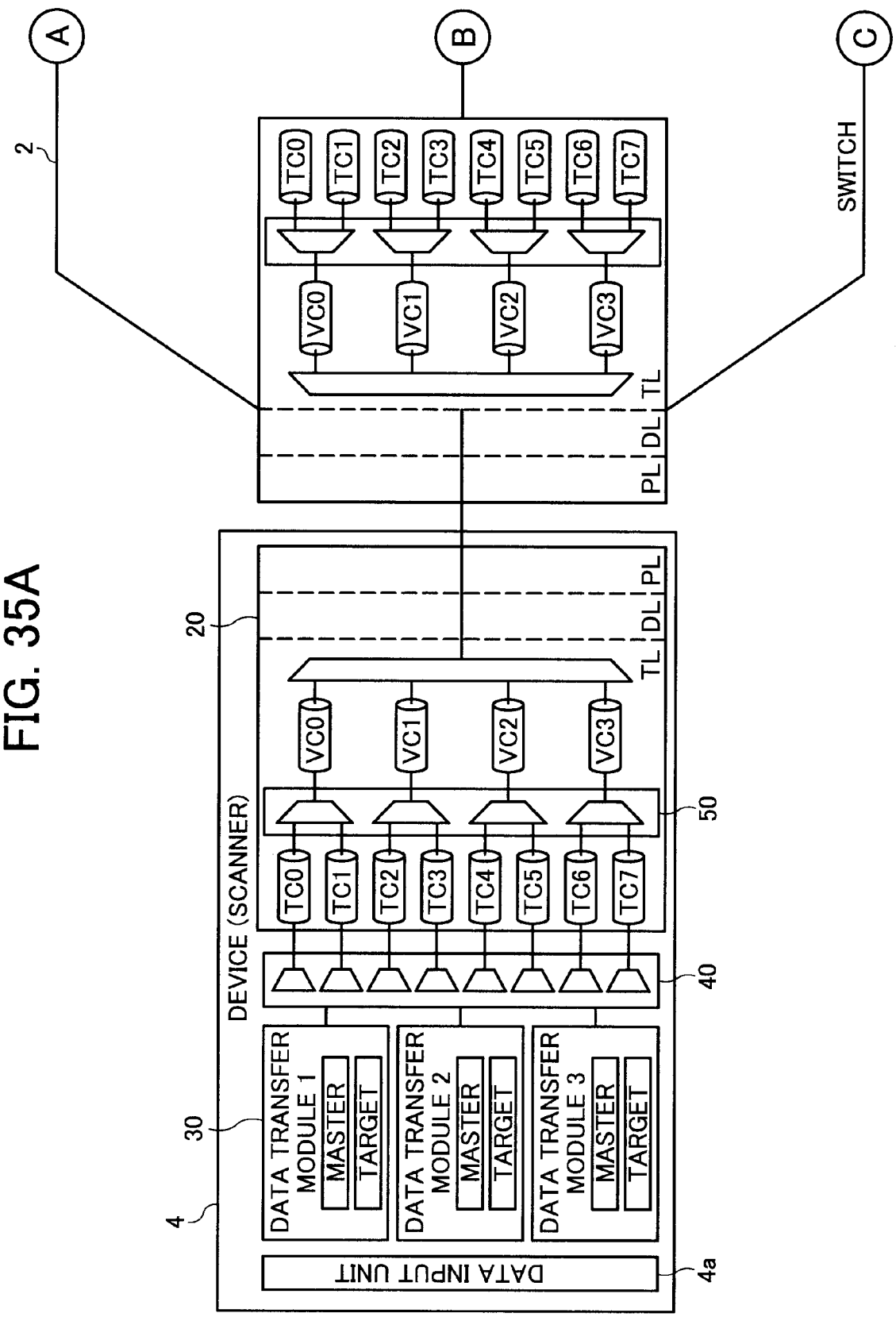
FIGS. 35A and 35B are block diagrams that partially depict the configuration of the information processing apparatus of FIG. 34 in detail.
Figure 35B:
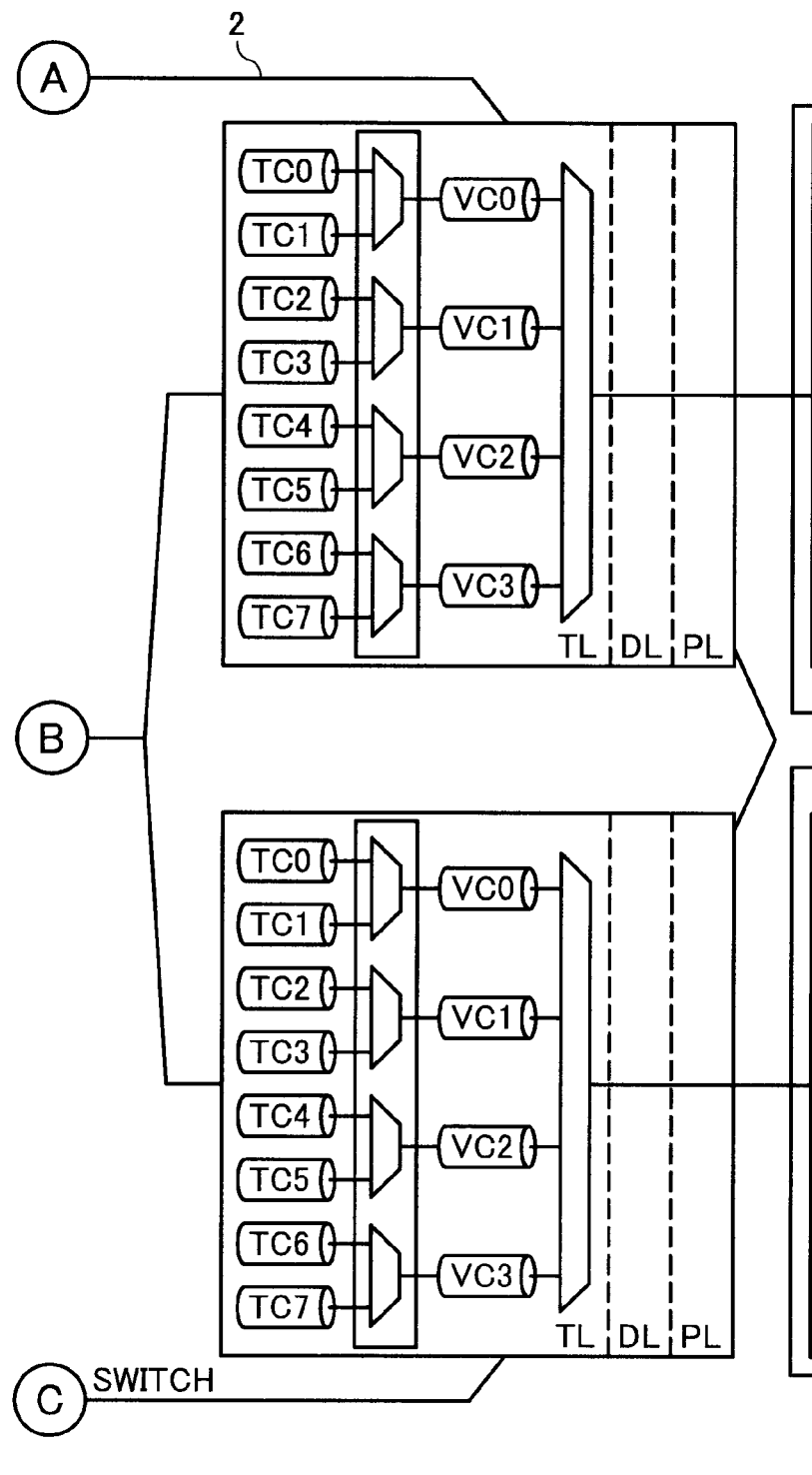

FIGS. 35A and 35B are block diagrams that partially depicts the configuration of the information processing apparatus 1 of FIG. 34 in detail. In FIGS. 35A and 35B, in particular, a state is depicted in which the scanner 4, the image processing unit 13, and the plotter 5 are connected through the ASI 2. Each device is configured of: a communication core 20 composed of a Transaction Layer (TL), a Data Link Layer (DL), and a Physical layer (PL); a function unique to the device other than the communication core (a data input unit 4a for the scanner 4; an image process unit 13a for the image processing unit 13; and a data output unit 5a for the plotter 5), a data transfer module 30, and a traffic-class setting unit 40.

The traffic-class setting unit 40 has a function of assigning a traffic occurring at each data transfer module 30 to a traffic class.

Also, the Transaction Layer (TL) of the communication core 20 includes a channel setting unit 50 for assigning a Traffic Class (TC) to a Virtual Channel (VC).

The traffic-class setting unit 40 and the channel setting unit 50 may be configured, as shown in FIGS. 35A and 35B, to allow assignment to be freely controlled, or may be configured so that association is narrowed down so as to make a traffic from the data transfer module 30 is uniquely determined with respect to a Virtual Channel (VC).

Figures 36, 36A:
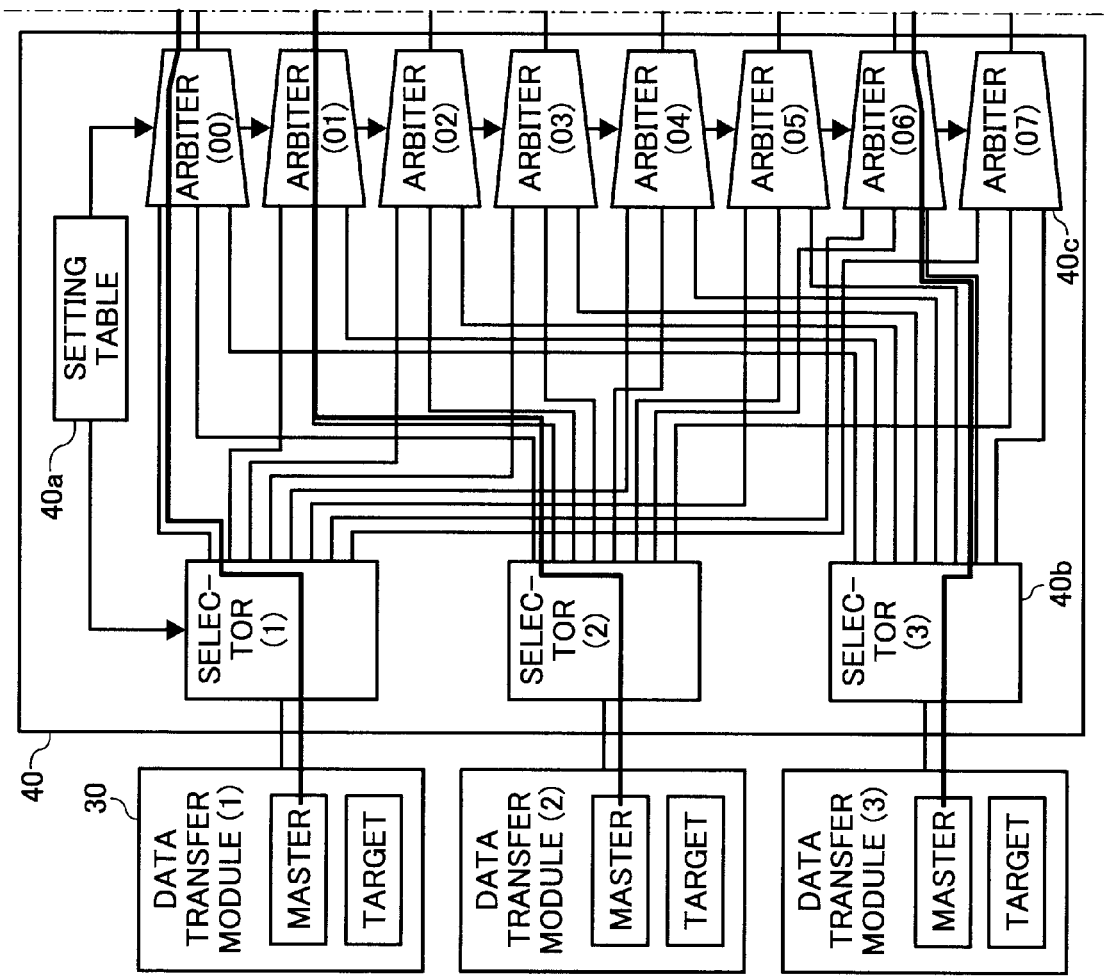
FIG. 36 is a block diagram of a configuration of a device in detail.
Figure 36B:
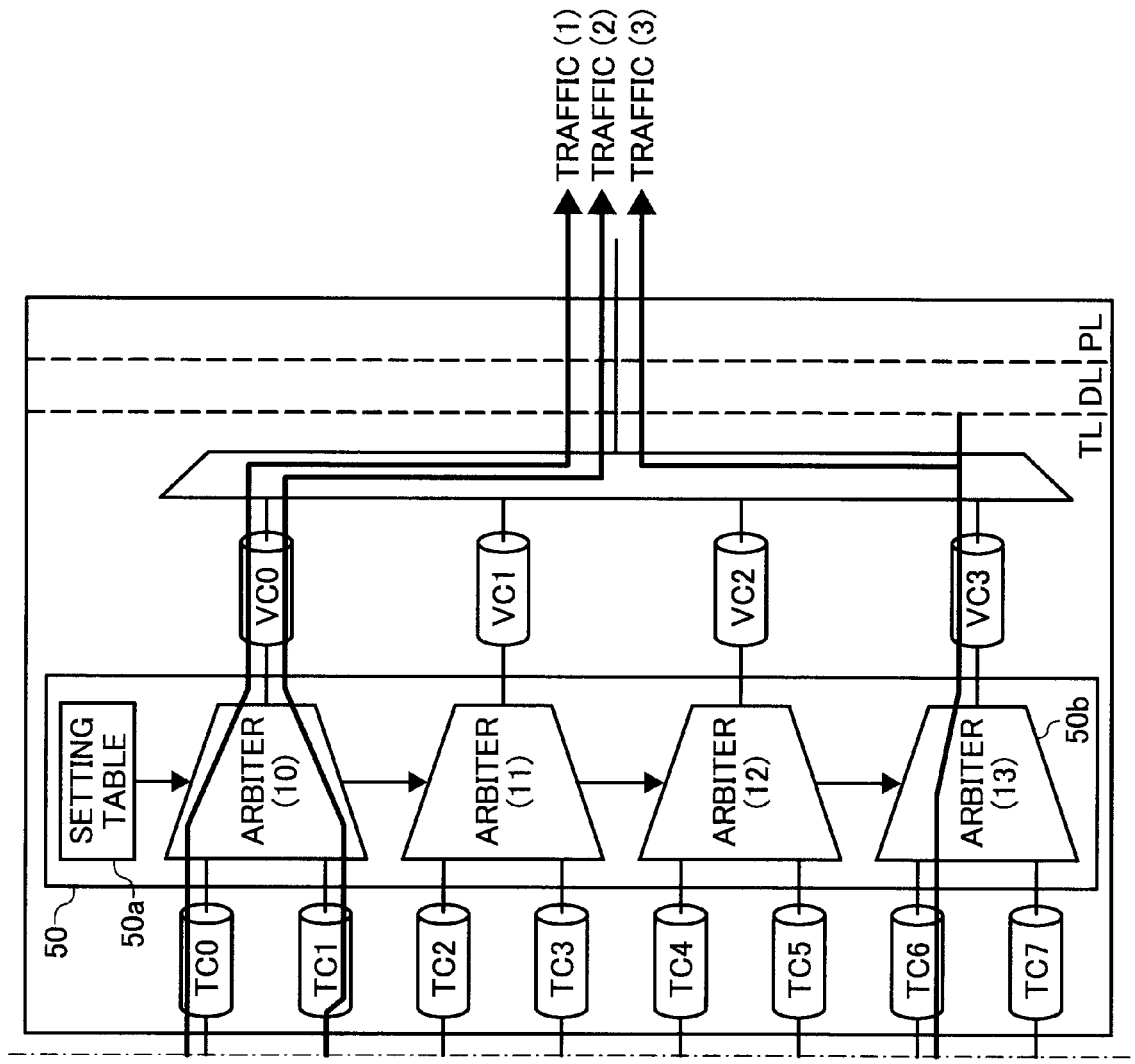
Figure 38:
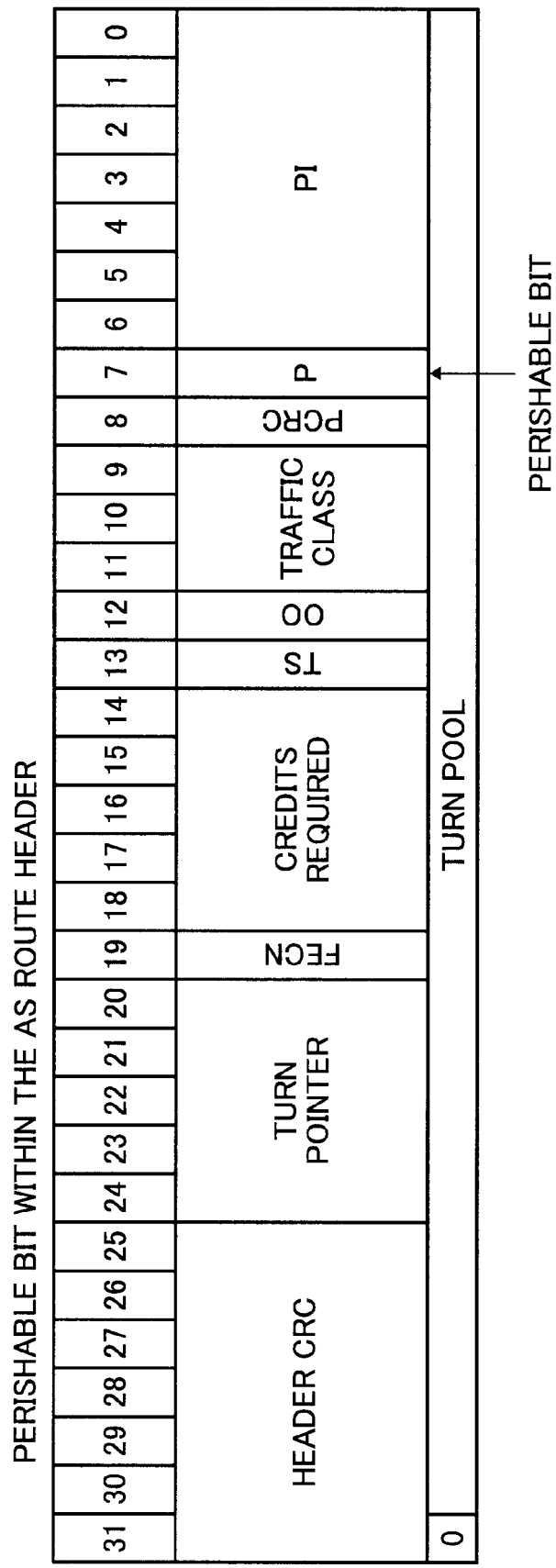
FIG. 38 is a schematic drawing for explaining a perishable bit of an ASI packet.

FIG. 36 is a block diagram of a detailed configuration of the device. The operation of each unit forming the device is explained in detail with reference to FIG. 36. Here, in FIG. 36, traffics are exemplarily depicted.

The traffic-class setting unit 40 includes a setting table 40a, a selector 40b, and an arbiter 40c. In the configuration shown in FIG. 36, the traffic of each data transfer module 30 can be set at any of the Traffic Classes (TCs). Alternatively, a configuration in which the minimum necessary association can be achieved does not pose a problem. In this case, all what is required is to provide only the minimum number of selectors 40b and arbiters 40c.

FIG. 37 is a schematic drawing of one example of the setting table 40a. As shown in FIG. 37, the setting table 40a stores a Traffic Class (TC) to be set by the traffic-class setting unit 40 for each group. In the example of FIG. 37, a data transfer module (1) and a data transfer module (2) are of a traffic group with page isochronous restriction, whilst a data transfer module (3) is of a traffic group with line isochronous restriction. According to the present embodiment, the Traffic Class (TC) to be associated is determined for each type of traffic group. Therefore, to assign the data transfer module (1) and the data transfer module (2), which are of the traffic group with page isochronous restriction, to TC0, the setting table 40 issues "0", which is a control command to a selector (1) and a selector (2). To assign the data transfer module (3), which is of the traffic group with line isochronous restriction, to TC6, the setting table 40a issues "6", which is a control command to a selector (3).

The channel setting unit 50 includes a setting table 50a and an arbiter 50b. Here, in the configuration shown in FIG. 36, only the minimum necessary association can be achieved. Alternatively, so as to be able to set traffics of each Traffic Class (TC) to all Virtual Channels (VCs), a selector may be provided for each Traffic Class (TC). In this case, as with the traffic-class setting unit 40, the channel setting unit 50 includes a setting table, a selector, and an arbiter.

To assign a traffic (1) occurring at the data transfer module (1) to TC0, a control signal is sent from the setting table 40a of the traffic-class setting unit 40 to the selector (1) and an arbiter (00). The selector (1) selects an output port based on the received control signal, and notifies the arbiter (00) of the traffic (1). The arbiter (00) performs arbitration of the input signal based on the control signal from the setting table 40a, although no conflicting traffic is input in the example shown in FIG. 36. As a result, the traffic (1) is assigned to TC0.

Similarly, to assign a traffic (2) occurring at the data transfer module (2) to TC1, a control signal is sent from the setting table 40a of the traffic-class setting unit 40 to the selector (2) and an arbiter (01). The selector (2) selects an output port based on the received control signal, and notifies the arbiter (01) of the traffic (2). The arbiter (01) performs arbitration of the input signal based on the control signal from the setting table 40a, although no conflicting traffic is input in the example shown in FIG. 36. As a result, the traffic (2) is assigned to TC1.

Similarly, to assign a traffic (3) occurring at the data transfer module (3) to TC6, a control signal is sent from the setting table 40a of the traffic-class setting unit 40 to the selector (3) and an arbiter (06). The selector (3) selects an output port based on the received control signal, and notifies the arbiter (06) of the traffic (3). The arbiter (06) performs arbitration of the input signal based on the control signal from the setting table 40a, although no conflicting traffic is input in the example shown in FIG. 36. As a result, the traffic (3) is assigned to TC6.

Traffics of TC0 (traffic (1)) and TC1 (traffic (2)) are input to an arbiter (10). The arbiter (10) performs arbitration of the input signal based on the control signal form the setting table 50a. As a result, the traffics of TC0 (traffic (1)) and TC1 (traffic (2)) are assigned to VC0.

Similarly, traffics of TC6 (traffic (3)) and TC7 (no traffic) are input to an arbiter (13). The arbiter (13) performs arbitration of the input signal based on the control signal form the setting table 50a, although no conflicting traffic is input in the example shown in FIG. 27. As a result, the traffic of TC6 (traffic (3)) is assigned to VC3.

According to the present embodiment, the Traffic Classes (TCs) of data is classified based on, for example, "isochrony" and "lossless/lossy". In more detail, classification is as listed further below. Here, by activating a perishable bit (refer to FIG. 38) of an AS packet (allowing packet dropping), a lossy function can be turned ON. Therefore, for group classification according to "lossless/lossy", the perishable bit of the AS packet can be referred to. That is, by referring to the perishable bit of the AS packet, lossless/lossy can be easily identified.

1. Group A: LSYNC Isochronous Restriction
   (1) the scanner 4→display image on the operation panel 10
   (2) display image on the operation panel 10→the plotter 5
2. Group B: Page Isochronous Restriction
   (3) the image memory 6→display image on the operation panel 10
   (4) display image on the operation panel 10→the image memory 6

(5) the image memory 6→display image on the operation panel 10

3. Group C: No Isochronous Restriction (Lossless)
   (6) the operation panel 10→the system controller 3
   (7) the operation panel 10→the system controller 3
   (8) the human-body detection sensor 8→the system controller 3 (human body detection: present/absent)
   (9) the individual detection sensor 11→the system controller 3 (individual detection: RFID (code))
   (10) the body-information input device 14→the system controller 3 (individual detection: biometrics data (such as fingerprints and an iris image))
   (11) the system controller 3→the operation panel 10, control information display (color matching)

4. Group D: No Isochronous Restriction (Lossy)
   (12) the external I/O 9→UI (moving picture output (Motion Picture Experts Group(MPEG)/audio video interleaved(AVI))
   (13) UI (camera unit)→NIC 12 (moving picture input)
   (14) the NIC 12→UI (audio output)
   (15) UI→the image memory 6 (audio input)
   (16) the NIC 12→display image on the operation panel 10(web still picture output)
   (17) the NIC 12→display image on the operation panel 10(web moving picture output)

In this manner, data communication between devices is classified into groups based on a predetermined condition (here, "isochrony" and "lossless/lossy").

Then, for each of the groups obtained through classification explained above, a priority of data communication is given by using a Traffic Class (TC). Here, the priorities of the data communication are determined by the traffic-class setting unit 40 as Group A>Group B>Group C>Group D.

That is, in data communication between devices, a group with a high isochronous restriction is subjected to data communication with a higher priority. Also, even without isochronous restriction, a lossless group is subjected to data communication with a higher priority.

That is, traffics with isochronous restriction requiring data transmission within a predetermined period of time are classified as a group. With this, the priority of a traffic with isochronous restriction output from such a device as the scanner 4 or the plotter 5 can be made higher than that of a traffic without isochronous restriction. Therefore, isochrony can be ensured for the scanner 4 and the plotter 5, for example, at the time of mixture of traffics. Also, traffics with isochronous restriction for each line synchronizing signal are classified as a group. With this, the priority of a traffic with isochronous restriction for each line synchronizing signal from such a device as the scanner 4 or the plotter 5 can be made higher than that of a traffic with isochronous restriction for each page. Therefore, isochrony can be ensured for the scanner 4 and the plotter 5, for example, at the time of mixture of traffics. Furthermore, traffics with isochronous restriction for each page are classified as a group. With this, the priority of a traffic with isochronous restriction for each page can be made higher than that of a traffic without isochronous restriction. Therefore, isochrony can be ensured at the time of mixture of traffics.

Still further, traffics without isochronous restriction are classified into groups according to lossless/lossy in a data compression scheme. With this, even without isochronous restriction, a lossless group can be subjected to data communication with priority.

For each Traffic Class (TC) with its priority of data communication determined, a Virtual Channel (VC) is mapped by the channel setting unit 50. It is assumed according to the present embodiment that one Traffic Class (TC) is mapped to one Virtual Channel (VC).

With this, the fabric management function (AS Fabric Mngmnt), which is upper software controlling ASI (Advanced Switching Interconnect), can control the priorities of transactions by using the Traffic Classes (TC).

As describe above, according to the present embodiment, in data communication between devices, a traffic class is set for each group according to the group table in which group classification is made based on the property of the traffic between devices, and the each set traffic class is assigned to each different virtual channel to give a priority of data communication, thereby freely expanding the devices having various traffics of different characteristics with respect to the high-speed serial switch fabric.

Furthermore, according to the present embodiment, data communication between devices is classified into groups based on "isochrony" and "lossless/lossy". This is merely an example, and classification can be arbitrary as long as Traffic Classes (TCs) of different properties can be obtained through classification.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a high-speed serial switch fabric configured to perform a mapping of a traffic class that is capable of differentiating traffic onto a virtual channel, the high-speed serial switch fabric connecting a plurality of devices;
   a traffic-class setting unit that sets, when a conflict occurs between devices connected to the high-speed serial switch fabric, the traffic class for traffic in the devices having the conflict, wherein the traffic-class setting unit sets the traffic class for each of command types of the traffic; and
   a channel setting unit that assigns each of set traffic classes to different virtual channels, and gives a priority of data communication to each of the set traffic classes.

2. The information processing apparatus according to claim 1, further comprising:
   a group table in which data communication between the devices is classified into groups based on properties of traffic between the devices, wherein
   the traffic-class setting unit sets the traffic class for each of the groups based on the group table.

3. The information processing apparatus according to claim 2, wherein traffic with isochronous restriction requiring data transmission within a predetermined time is classified as a group in the group table.

4. The information processing apparatus according to claim 3, wherein traffic with isochronous restriction in units of line synchronizing signal are classified as a group in the group table.

5. The information processing apparatus according to claim 3, wherein traffic with isochronous restriction in page units is classified as a group in the group table.

6. The information processing apparatus according to claim 3, wherein traffic without the isochronous restriction is classified into groups based on the presence or absence of losses in a data compression scheme in the group table.

7. The information processing apparatus according to claim 6, wherein when classifying the traffic into groups based on the presence or absence of losses in the data compression scheme, the channel setting unit refers to a perishable bit in an advanced switching interconnect packet.

8. The information processing apparatus according to claim 1, wherein the high-speed serial switch fabric is a switch fabric conforming to advanced switching interconnect standards.

9. The information processing apparatus according to claim 1, wherein,
the channel setting unit sets a priority of the traffic class of a traffic with isochronous restriction in units of line synchronizing signal higher than a priority of the traffic class of traffic with isochronous restriction in page units according to a setting of the virtual channel.

10. The information processing apparatus according to claim 1, wherein the channel setting unit sets a priority of a traffic class of a memory read transaction higher than a priority of a traffic class of a memory write transaction according to a setting of the virtual channel.

11. An information processing system comprising:
an information processing apparatus including:
an image input device that reads image data,
a storage device that stores read image data, and
an image output device that outputs stored image data;
a high-speed serial switch fabric that connects a plurality of other information processing apparatuses;
a traffic-class setting unit that sets, when a conflict occurs between information processing apparatuses connected to the high-speed serial switch fabric, the traffic class for traffic in the information processing apparatus having the conflict, wherein the traffic-class setting unit sets the traffic class for each of command types of the traffic; and
a channel setting unit that assigns each of set traffic classes to different virtual channels, and gives a priority of data communication to each of the set traffic classes.

12. The information processing system according to claim 11, wherein,
when the image data read by the image input device of one of the information processing apparatuses is transferred to the storage device of each of the information processing apparatuses by multicast, and the image data stored in each storage device is output from the image output device of each of the information processing apparatuses, the channel setting unit sets a priority of data communication in the virtual channels of the high-speed serial switch fabric as;
memory read command>memory write command.

13. The information processing system according to claim 11, wherein,
when the image data read by the image input device of one of the information processing apparatuses is transferred to the storage device, and the image output device of each of the information processing apparatuses issues a memory read command to the storage device to output the image data stored in the storage device, the channel setting unit sets a priority of data communication in the virtual channels of the high-speed serial switch fabric as:
memory read command>memory write command.

14. The information processing system according to claim 11, wherein1 when the image data read by the image input device of one of the information processing apparatuses is transferred to the storage device, a memory write transfer is caused to occur for the image data stored in the storage device by multicast, and the image data is output from the image output device of each of the information processing apparatuses, the channel setting unit sets a priority of data communication in the virtual channels of the high-speed serial switch fabric as:
memory read command>memory write command.

15. A data communication method comprising:
setting, when a conflict occurs between devices connected to a high-speed serial switch fabric configured to perform a mapping of a traffic class that is capable of differentiating traffic onto a virtual channel, the traffic class for traffic in the devices having the conflict;
assigning each of set traffic classes to different virtual channels; and
giving a priority of data communication to each of the set traffic classes.

* * * * *